US 9,673,431 B2

(12) United States Patent
Despesse

(10) Patent No.: US 9,673,431 B2
(45) Date of Patent: Jun. 6, 2017

(54) BATTERY HAVING A BRICK ARCHITECTURE INCLUDING CELLS ARRANGED IN SERIES OR IN PARALLEL

(75) Inventor: Ghislain Despesse, Saint Egreve (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 667 days.

(21) Appl. No.: 14/232,384

(22) PCT Filed: Jul. 13, 2012

(86) PCT No.: PCT/EP2012/063761
§ 371 (c)(1),
(2), (4) Date: Jun. 4, 2014

(87) PCT Pub. No.: WO2013/007810
PCT Pub. Date: Jan. 17, 2013

(65) Prior Publication Data
US 2014/0287278 A1 Sep. 25, 2014

(30) Foreign Application Priority Data
Jul. 13, 2011 (FR) ..................... 11 56384

(51) Int. Cl.
*H01M 2/00* (2006.01)
*H01M 2/10* (2006.01)
(Continued)

(52) U.S. Cl.
CPC ....... *H01M 2/1083* (2013.01); *B60L 11/1855* (2013.01); *B60L 11/1864* (2013.01);
(Continued)

(58) Field of Classification Search
CPC .............. B60L 11/1855; B60L 11/1864; B60L 11/1877; B60L 15/007; H01M 10/0445;
(Continued)

(56) References Cited

U.S. PATENT DOCUMENTS 4,175,249 A * 11/1979 Gruber ...................... G05F 1/67
136/293
6,118,932 A * 9/2000 Maurio ................... H02M 7/49
318/800
(Continued)

FOREIGN PATENT DOCUMENTS

CN    102097844 A  *  1/2011  ............... H02J 7/00
CN    102097844 A      6/2011
(Continued)

OTHER PUBLICATIONS

Notification of the First Office Action issued by SIPO for corresponding Chinese application 201280042887.X dated Jul. 22, 2015 with English translation.

*Primary Examiner* — Vuthe Siek
(74) *Attorney, Agent, or Firm* — Haug Partners LLP

(57) ABSTRACT

Battery comprising several cells disposed in several modules (112) linked together in series, characterized in that it comprises at least one brick (120) comprising a lower terminal and an upper terminal, between which are arranged two cells (111) and at least three switches (113), so as to be able to dispose the two cells (111) in series or in parallel between the two terminals and in that the battery comprises a control circuit (127) for the switches (113) of the said at least one brick.

35 Claims, 22 Drawing Sheets

(51) Int. Cl.
  *H01M 10/04* (2006.01)
  *H01M 10/42* (2006.01)
  *H01M 10/48* (2006.01)
  *B60L 11/18* (2006.01)
  *B60L 15/00* (2006.01)
  *H02M 7/483* (2007.01)

(52) U.S. Cl.
  CPC ......... *B60L 11/1877* (2013.01); *B60L 15/007* (2013.01); *H01M 2/1072* (2013.01); *H01M 2/1077* (2013.01); *H01M 10/0445* (2013.01); *H01M 10/425* (2013.01); *H01M 10/4207* (2013.01); *H01M 10/4257* (2013.01); *H01M 10/482* (2013.01); *H02M 7/483* (2013.01); *Y02T 10/645* (2013.01); *Y02T 10/7005* (2013.01); *Y02T 10/7061* (2013.01)

(58) Field of Classification Search
  CPC ........... H01M 10/4207; H01M 10/425; H01M 10/4257; H01M 10/482; H01M 2/1072; H01M 2/1077; H01M 2/1083; H02M 7/483; Y02T 10/645
  See application file for complete search history.

(56) References Cited

U.S. PATENT DOCUMENTS

| | | | |
|---|---|---|---|
| 6,121,752 A | 9/2000 | Kitahara et al. | |
| 7,573,234 B1 | 8/2009 | Tsukamoto et al. | |
| 8,963,372 B2 | 2/2015 | Takano et al. | |
| 2008/0193832 A1 | 8/2008 | Doffin et al. | |
| 2008/0210286 A1 | 9/2008 | Ball | |
| 2009/0079412 A1* | 3/2009 | Kuo | H01L 31/02008 323/299 |
| 2009/0183763 A1 | 7/2009 | Meyer | |
| 2010/0037936 A1* | 2/2010 | Becker | H01L 31/02008 136/248 |
| 2010/0072950 A1 | 3/2010 | Tatebayashi et al. | |
| 2010/0127570 A1 | 5/2010 | Hadar et al. | |
| 2010/0248051 A1* | 9/2010 | Shimoda | B60L 11/1881 429/428 |
| 2011/0006742 A1 | 1/2011 | Teggatz et al. | |
| 2011/0089901 A1* | 4/2011 | White | H02J 7/0068 320/118 |
| 2012/0153727 A1 | 6/2012 | Takano et al. | |
| 2012/0274140 A1* | 11/2012 | Ganor | H02J 7/0011 307/71 |

FOREIGN PATENT DOCUMENTS

| FR | 2926 168 A | 7/2009 |
|---|---|---|
| WO | WO 2006/100391 A | 9/2006 |
| WO | WO 2011/025029 A | 3/2011 |

* cited by examiner

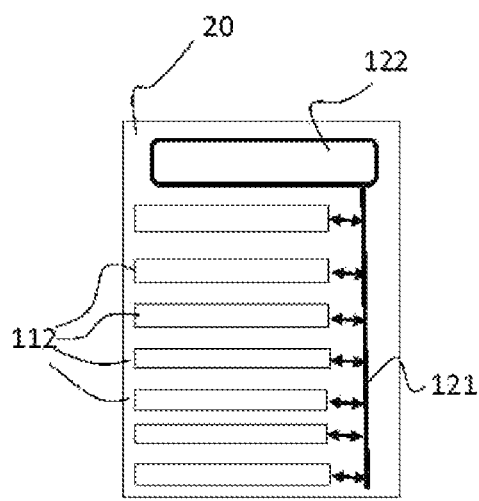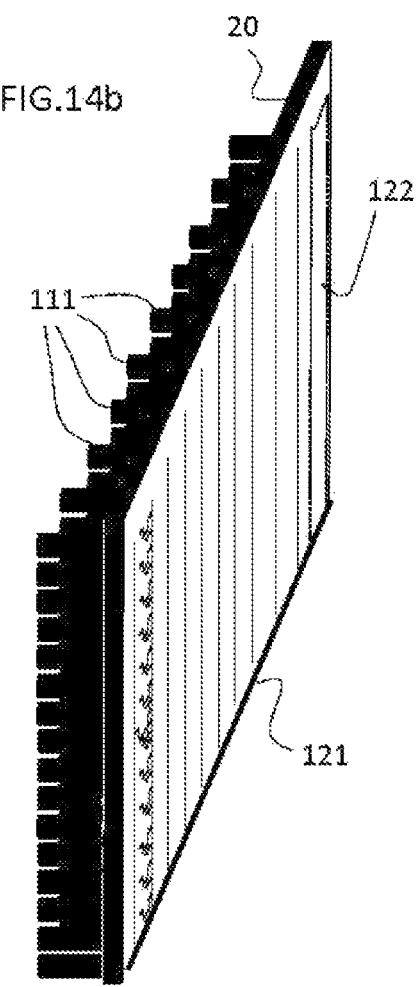

US 9,673,431 B2

BATTERY HAVING A BRICK ARCHITECTURE INCLUDING CELLS ARRANGED IN SERIES OR IN PARALLEL

This application is a 371 of PCT/EP2012/063761 filed on Jul. 13, 2012, published on Jan. 17, 2013 under publication number WO 2013/007810, which claims priority benefits from French Patent Application Number 1156384 filed Jul. 13, 2011, the disclosure of which is incorporated herein by reference.

The invention relates to a battery. It relates particularly to a battery comprising several stages of several elementary cells. It also relates to a method of battery management.

FIGS. 1 and 2 represent a battery according to the prior art, also referred to as a "battery pack". Such a battery pack, that we will subsequently refer to simply as a battery, is composed of a multitude of elementary batteries. An elementary battery such as this takes for example a cylindrical form, comprises a multitude of positive and negative electrodes, taking the form of nested concentric cylinders or of layers wound in a spiral shape, separated by layers of electrolytes and of membranes. These elements represent the active part of the structure of the elementary battery, that is to say they form an assembly which participates directly in the electrical energy storage and retrieval function. In this example, this active part is of chemical nature. As a remark, an elementary battery such as this, also referred to as an elementary cell, can comprise an active part based on other chemical components, or an active part of capacitive nature. Moreover, the active part of the elementary battery is disposed in a housing of which a first external face forms the positive terminal or first current collector of the battery and a second external face forms the negative terminal or second current collector. The function of this housing is to hold and support the active part of the battery, and its leaktightness in relation to the outside. It encloses a physical assemblage which forms an indissociable set monolithic assembly, whose electrical connection technology is un-modifiable for a user of the elementary battery, that sees an outgoing current equal to the incoming current on its two terminals. We will therefore refer to this assembly formed by an active part and a housing with two terminals as a battery or elementary cell, and even more simply a cell. A battery represented in FIGS. 1 and 2 comprises more precisely several stages or modules 2, disposed in series, and each module comprises several cells 1 disposed in parallel, as is illustrated schematically in FIG. 1.

FIG. 2 represents a commonplace architecture of such a battery, for which each cell exhibits a cylindrical shape and is for example a battery of lithium-ion type. In this example, each module 2 comprises two rows of ten cells 1, the cylindrical lateral faces of whose neighbour cells are in contact. Moreover, the battery comprises eleven superposed modules 2, disposed such that the axes of the cylindrical cells of the various modules are aligned so that the cells are thus aligned in their longitudinal direction. This disposition thus makes it possible to obtain minimum bulk.

The use of such a prior art battery to power a motor 5 requires an intermediate device 6 of DC/DC or DC/AC converter type, disposed between the battery and the motor 5, such as represented in FIG. 3. The function of the device 6 is to adjust the output voltage of the battery to the needs of the motor 5, so as to thus adapt to the speed and to the torque demanded of the motor. As a remark, the same principle applies to any load powered by the battery. Moreover, during the recharging of the battery, an equivalent device must be used between the electrical network and the battery to follow the input voltage of the electrical network. The use of these intermediate devices linked to the battery presents several drawbacks, among which the generation of losses at the level of the transistors and other components used, thereby giving rise globally to additional energy consumption. Moreover, this represents additional bulk.

The management of such a prior art battery comprises in general an observation of the output electrical magnitudes so as to deduce therefrom a diagnosis of its operation. This approach turns out to be insufficient since it does not make it possible to precisely determine the zones of the battery, such as the modules or certain groups of cells, which have for example failed. In practice this results in poor optimization of the operation of the battery and a very rapid decline in its performance as soon as it exhibits a failed part, often accompanied by rapid worsening of its state and premature aging.

To improve this global approach, certain methods of diagnosis exist which consist in observing certain magnitudes at the level of the modules of the battery. This second approach makes it possible more precisely to observe the particular behaviour of certain modules of the battery locally. However, its implementation is complex and requires the use of numerous electrical wires, to link a central diagnosis device to each module, and this may induce high electrical risks since the wires are liable to get hot, or to become bare through rubbing and then to generate short-circuits, for example between two stages that are relatively far apart and of large potential difference. Moreover, this solution requires an intermediate galvanic isolation to protect the central diagnosis device, the potential of which, associated with its power supply, may be very far from the potentials present in the battery. Finally, it makes it possible to act only in an unsatisfactory manner on the global operation of the battery.

In addition to such a conventional battery such as presented hereinabove, the document FR2926168 describes an electrical circuit comprising a plurality of switchable energy storage elements, associated with an energy-generating means, so as to provide a variable voltage at output in order to adapt to the needs of a motor. Such an approach affords flexibility of use with respect to the conventional battery described hereinabove but does not afford any solution to all the other drawbacks mentioned.

Thus, there exists a need for an improved energy storage solution making it possible to solve at least some of the drawbacks of the existing solutions, and the invention seeks to achieve all or some of the following objects.

A first object of the invention is to propose an energy storage solution which makes it possible to guarantee reliable and lengthy operation.

A second object of the invention is to propose an energy storage solution which adapts easily to various requirements of use, such as variable needs of a motor.

For this purpose, the invention relies on a battery comprising several cells disposed in several modules linked together in series, characterized in that it comprises at least one module comprising a brick comprising a lower terminal and an upper terminal, between which are arranged two cells and at least three switches, so as to be able to dispose the two cells in series or in parallel between the two terminals and in that the battery comprises a control circuit for the switches of the said at least one brick.

The at least one brick can comprise a first vertical branch extending between its lower and upper terminals and comprising in this order a cell and a switch, a second vertical branch between its lower and upper terminals comprising in this order a switch and a cell, and a transverse branch comprising a switch and linking respectively the intermediate terminals disposed between the cell and the switch of each of the two vertical branches.

The at least one brick can comprise two additional switches disposed respectively on each vertical branch on the cell side.

The battery can comprise a module comprising a lower terminal and an upper terminal, between which are disposed two bricks, linked by three branches and three switches disposed respectively between the two lower terminals of the two bricks, between their two upper terminals, and between the upper terminal of the first lower brick and the lower terminal of the second upper brick, so as to be able to dispose the two bricks in series or in parallel.

The battery can comprise a module comprising a lower terminal and an upper terminal, between which are disposed several sets of more than two bricks being able to be disposed in series or in parallel, these sets being able to be disposed in series and/or in parallel between the two terminals, lower and upper, of the module with the aid of several switches.

The battery can comprise a module comprising a lower terminal and an upper terminal, between which are disposed four bricks so as to form a superbrick, this superbrick comprising a first set comprising a first brick linked to the lower terminal of the module, and linked to a second brick linked to the upper terminal of the module by way of three switches making it possible to dispose these two bricks in series or in parallel, and comprising a second set of two other bricks disposed between the two terminals, lower and upper, of the module in parallel with the first set of the two bricks.

The battery can comprise at least one intermediate electrical link distinct from the upper and lower terminals between the two sets of two bricks.

The battery can comprise a lower terminal and an upper terminal between which are disposed several bricks in parallel, and/or several sets of two bricks joined together in parallel, and/or several superbricks in parallel.

The battery can comprise at least one module which comprises several switches so as to be able to cancel the output voltage of the module and/or to form a device for inverting the output voltage of the module (function of H-bridge type).

All the modules of the battery can comprise a device of H-bridge type for inverting their output voltage, to invert, cancel the output voltage or shunt one or more module(s).

The battery can comprise a control circuit for at least one switch supplied electrically directly by at least one cell of a module of the battery.

The battery can comprise at least one switch able to shunt one or more successive modules of the battery.

The control circuit can drive at least one transistor used to form a cell switch, and/or at least one transistor used to form a module switch and/or at least one transistor to form a device for series/parallel inversion between two bricks of a module, and/or at least one transistor to form a device for inverting or cancelling the output voltage of the module (function of H-bridge type), and/or at least one transistor to shunt several adjacent modules.

The battery can comprise an electronic card disposed between each module of the battery or a single electronic card on which are disposed all the modules of the battery or several electronic cards each associated with one or more module(s).

The battery can comprise at least one sensor for measuring a magnitude characteristic of the state of the cells of a module and the control circuit for the switches of the module can control them as a function of the magnitude characteristic of the state of its cells and as a function of the demand of a load powered by the battery.

The battery can comprise a sensor for measuring the current at the level of a cell, and/or a sensor for measuring the voltage across the terminals of a cell and/or across the terminals of its cell switch, and/or a sensor for measuring the temperature of a cell and/or for impedance spectrometry measurement.

The battery can comprise at least one processing circuit at the level of a module and/or a central computer, which drives (drive) the switches of a module by way of the control circuit.

The battery can comprise a central computer and a communication bus linking the various modules to the central computer by way of a galvanic isolation.

The switches of the at least one brick can be transistors.

The battery can comprise several parts of several modules comprising cells of different electrochemical technology.

The invention also pertains to a method for managing a battery such as defined previously, characterized in that it comprises a step of determining the position of the switches of a brick of the battery so as to dispose its two cells in series or in parallel.

The method for managing a battery can comprise the following actuations of the switches of a brick of the battery:
  closing of the switches disposed on a vertical branch between the lower and upper terminals of a brick of the battery, and opening of a switch disposed on a transverse branch linking respectively the intermediate terminals disposed between the cell and a switch of each of the two vertical branches, so as to dispose the two cells of the brick in parallel, or
  opening of the switches disposed on a vertical branch between the lower and upper terminals of a brick of the battery, and closing of a switch disposed on a transverse branch linking respectively the intermediate terminals disposed between the cell and a switch of each of the two vertical branches, so as to dispose the two cells of the brick in series.

The method for managing a battery can comprise the placing in parallel of the two cells of a brick when the current demanded at output of the battery exceeds a certain threshold, and a placing in series of the two cells of the brick when the voltage demanded at output of the battery exceeds a certain threshold.

The method for managing a battery can comprise the following actuations of the switches of a brick of the battery:
  closing of the switches disposed on a vertical branch between the lower and upper terminals of a brick of the battery and of a switch positioned on the transverse branch and openings of additional switches disposed respectively on each vertical branch on the cell side, so as to obtain a zero voltage difference between the upper and lower terminals of the brick,
  closing of the switches disposed on a first vertical branch between the lower and upper terminals of a brick and opening of at least one other switch so as to disconnect the cell of the second vertical branch of the brick and obtain the operation of the brick with solely the cell of the first vertical branch.

The method for managing a battery can comprise a step of electrical powering of a control circuit of a switch of a brick of the battery on the basis of at least one cell of the battery.

The method for managing a battery can comprise the following steps:
- measurement of at least one magnitude at the level of a cell of the battery, representative of the state of the cell;
- transmission of the said measured magnitude to at least one processing circuit or a computer;
- determination of the position of a switch of a brick by taking into account the said measured magnitude;
- control of the opening or closing of at least one switch of the brick comprising the said cell.

The method for managing a battery can comprise a step consisting in comparing a measured magnitude with a threshold to diagnose the state of the cell, estimate the charge of the cell and/or its state of health.

The method for managing a battery can comprise all or some of the following steps:
- mutual balancing of the modules and/or cells, by using by priority the modules and/or cells with the most charge when the battery is connected to a load and the modules and/or the cells with the least charge during the recharging of the battery;
- balancing of the modules and/or cells by modifying the mean rate of use of the modules and/or cells, but without using the same modules and/or cells permanently, so that the charge of the modules and/or cells balances;
- choice of use of the modules as a function of the current that they can provide;
- limitation of the use of the modules and/or cells whose temperature is the highest or use in a preferential manner when the current demanded is lower;
- maintaining homogeneous of the temperature within the battery.

The method for managing a battery can comprise a step of cyclic opening/closing of at least one switch of a brick of the battery so as to disconnect/connect a cell of the brick, the duty ratio being fixed as a function of the total time of use of the said cell, itself determined as a function of the global need in terms of current and voltage of the battery and as a function of the diagnosis of the cell considered.

The method for managing a battery can comprise a step of communication by carrier current between a processing circuit of a brick and that of another brick or a central computer or a load.

The method for managing a battery can comprise a step of regulating the output voltage of the battery which comprises a step of opening/closing of switches of bricks of the battery so as to follow an imposed output voltage setpoint.

The method for managing a battery can comprise a step of disconnecting all the cells of the battery in case of prolonged stoppage of the battery or of incident.

The method for managing a battery can comprise a step of diagnosing the operation of all or some of the switches.

The method for managing a battery can comprise a step of estimating the state of health SOH of a cell comprising a cycle of charging and discharging of the said cell, during the normal operation of the remainder of the battery.

The method for managing a battery can comprise a step of estimating the complex electrical impedance of a cell by observing its response in current and/or voltage to its connection and/or disconnection either forced, or during the normal operation of the battery.

These objects, characteristics and advantages of the present invention will be set forth in detail in the following description of particular embodiments given without limiting effect in conjunction with the attached figures, among which:

FIG. 1 schematically represents the structure of a battery according to a prior art.

FIG. 2 represents in perspective the real architecture of such a prior art battery.

FIG. 3 schematically represents the electrical circuit of a motor using such a prior art battery for its power supply.

FIG. 4 schematically represents a battery according to one embodiment of the invention.

Figure 13:
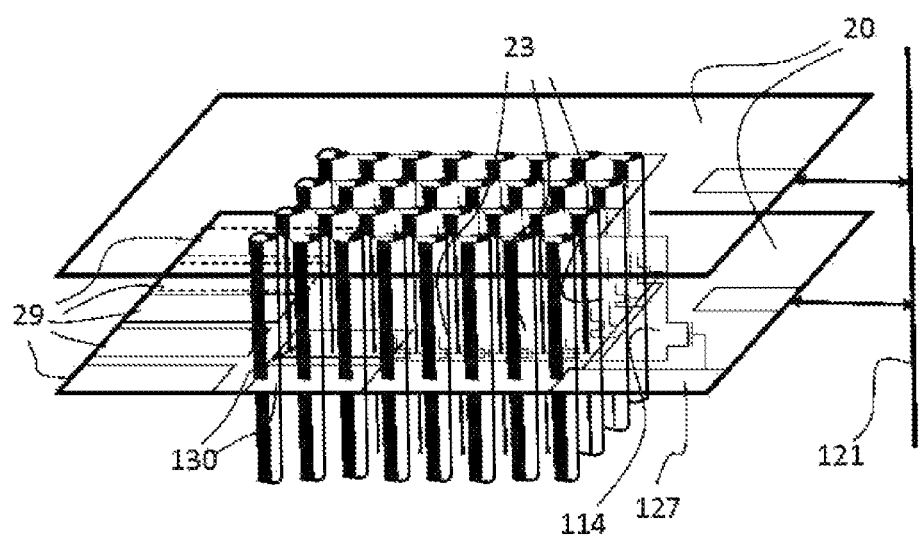

FIG. 13 more precisely illustrates the components present on each electronic card of the embodiment of the invention.

FIGS. 14a and 14b illustrate a variant embodiment of the embodiment of the invention.

Figure 15:
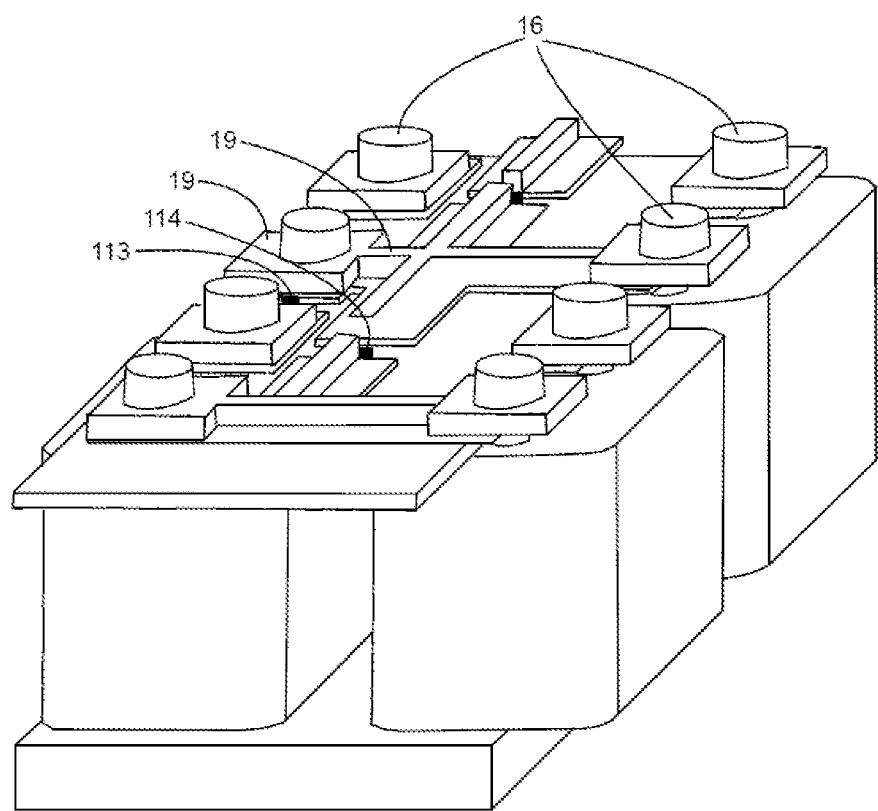

FIG. 15 represents in a more detailed manner the architecture of the electronic card according to this variant embodiment of the embodiment of the invention.

Figure 16:
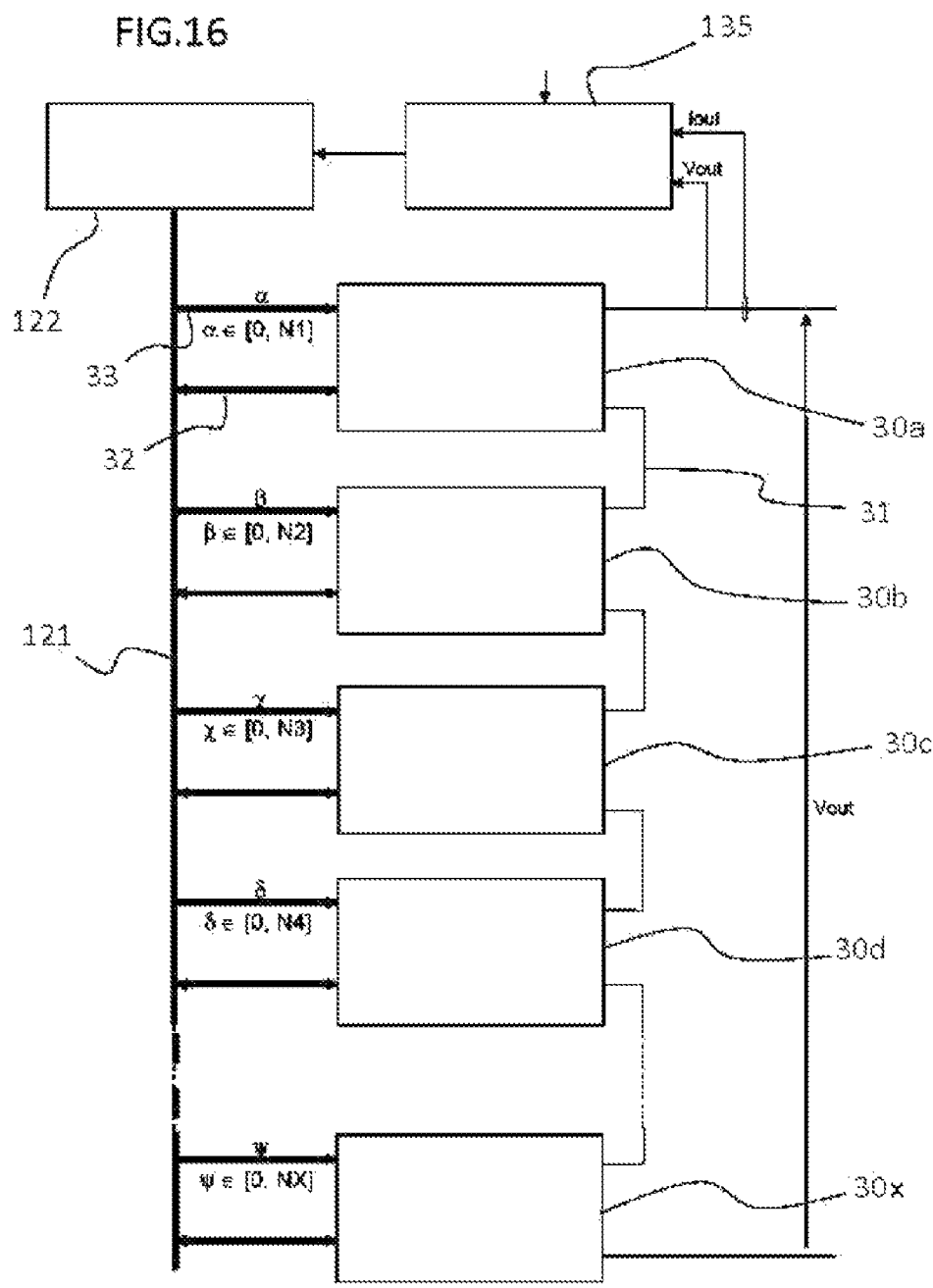

FIG. 16 represents a functional view of the architecture of a battery according to one embodiment of the invention.

Figure 17:
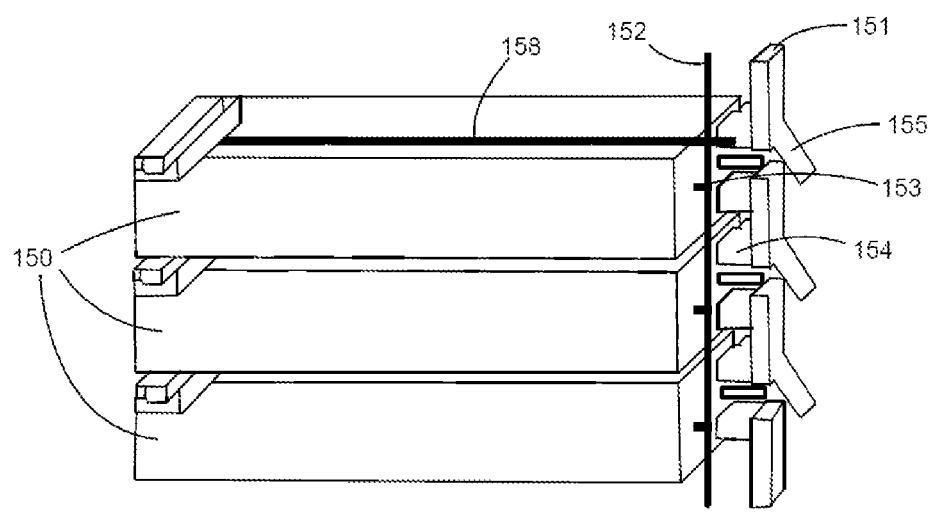

FIG. 17 illustrates an embodiment of a frame integrating a battery according to the invention.

Figure 18:
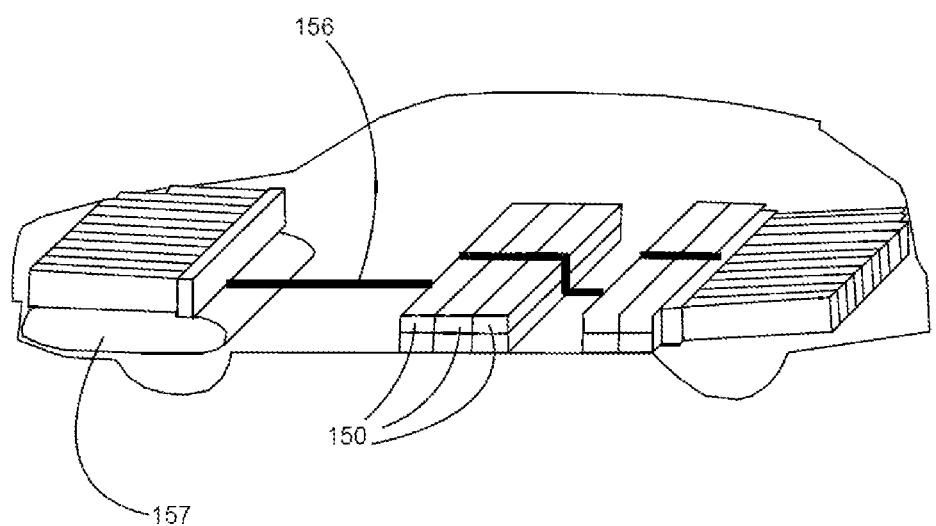

FIG. 18 illustrates the previous frame integrated within an automotive vehicle according to one embodiment of the invention.

Figure 19:
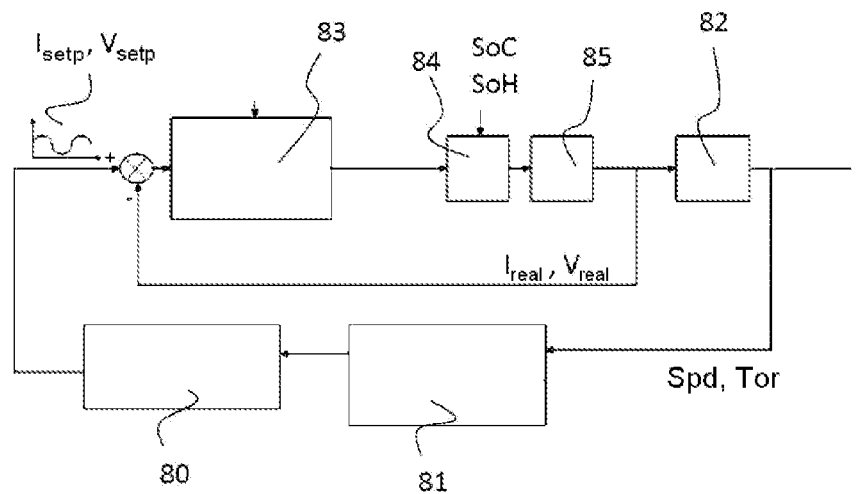

FIG. 19 illustrates an embodiment of a slaved control of the battery according to the invention.

Figure 20:
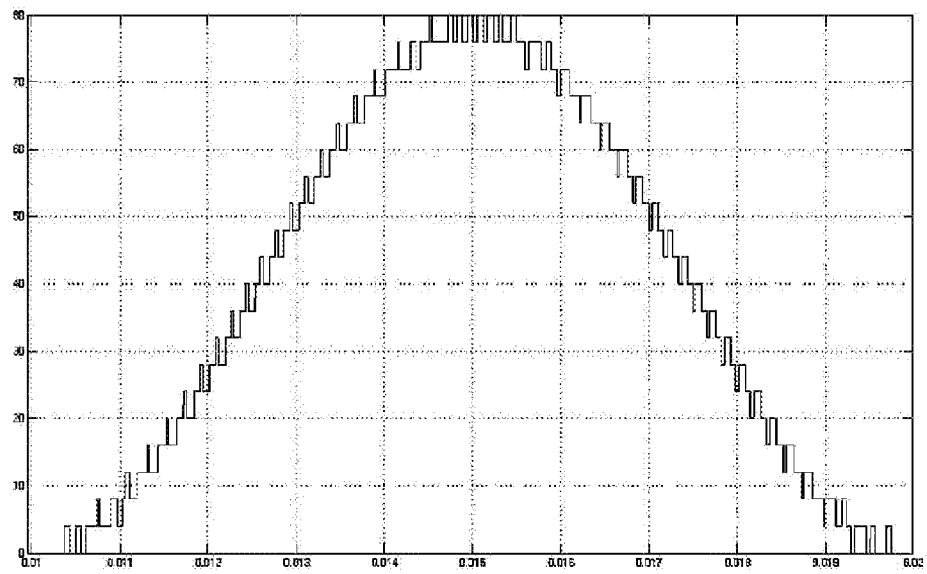

FIG. 20 represents an exemplary voltage which can be provided by the battery according to the invention.

Figure 21:
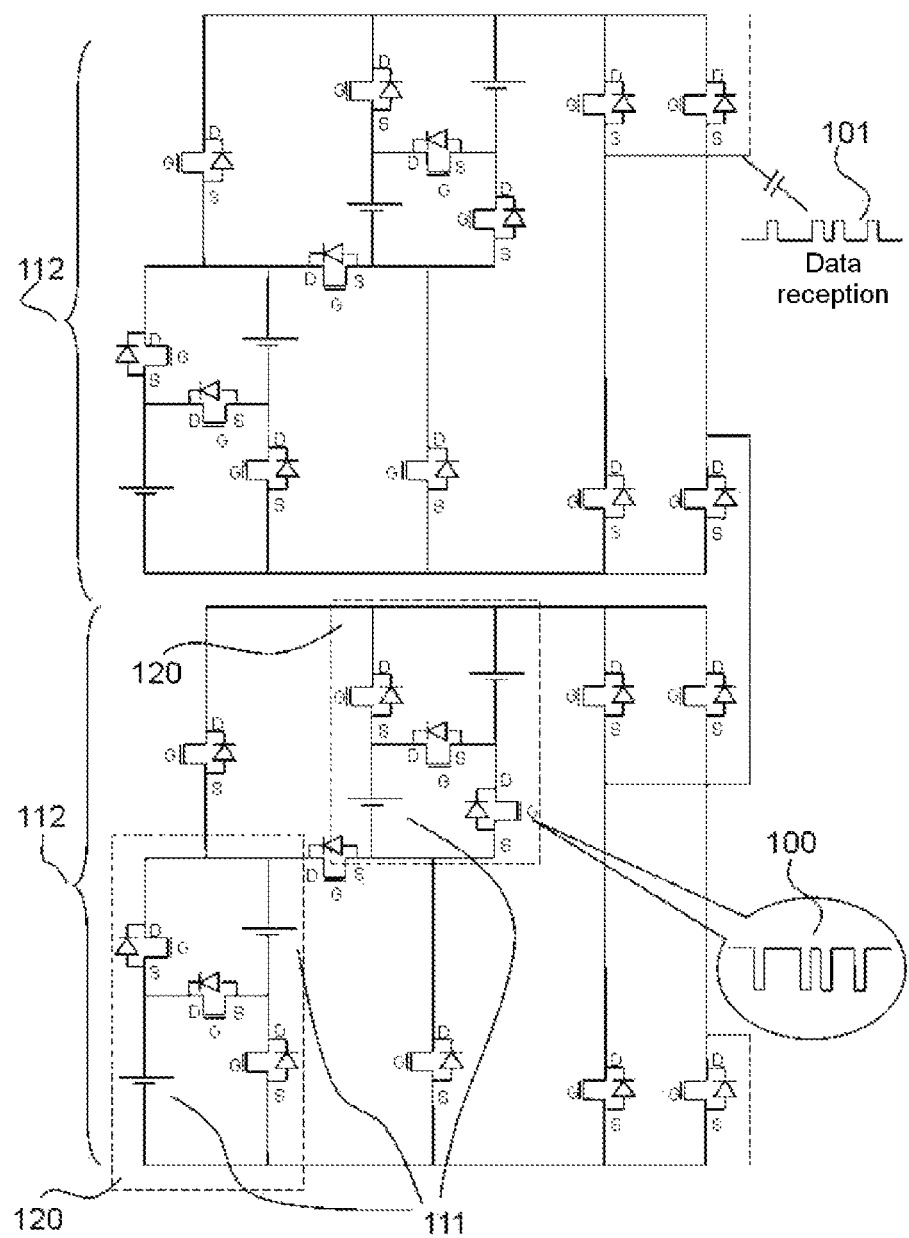

FIG. 21 schematically illustrates the implementation of the principle of communication by carrier current within the battery according to one embodiment of the invention.

Figure 22:
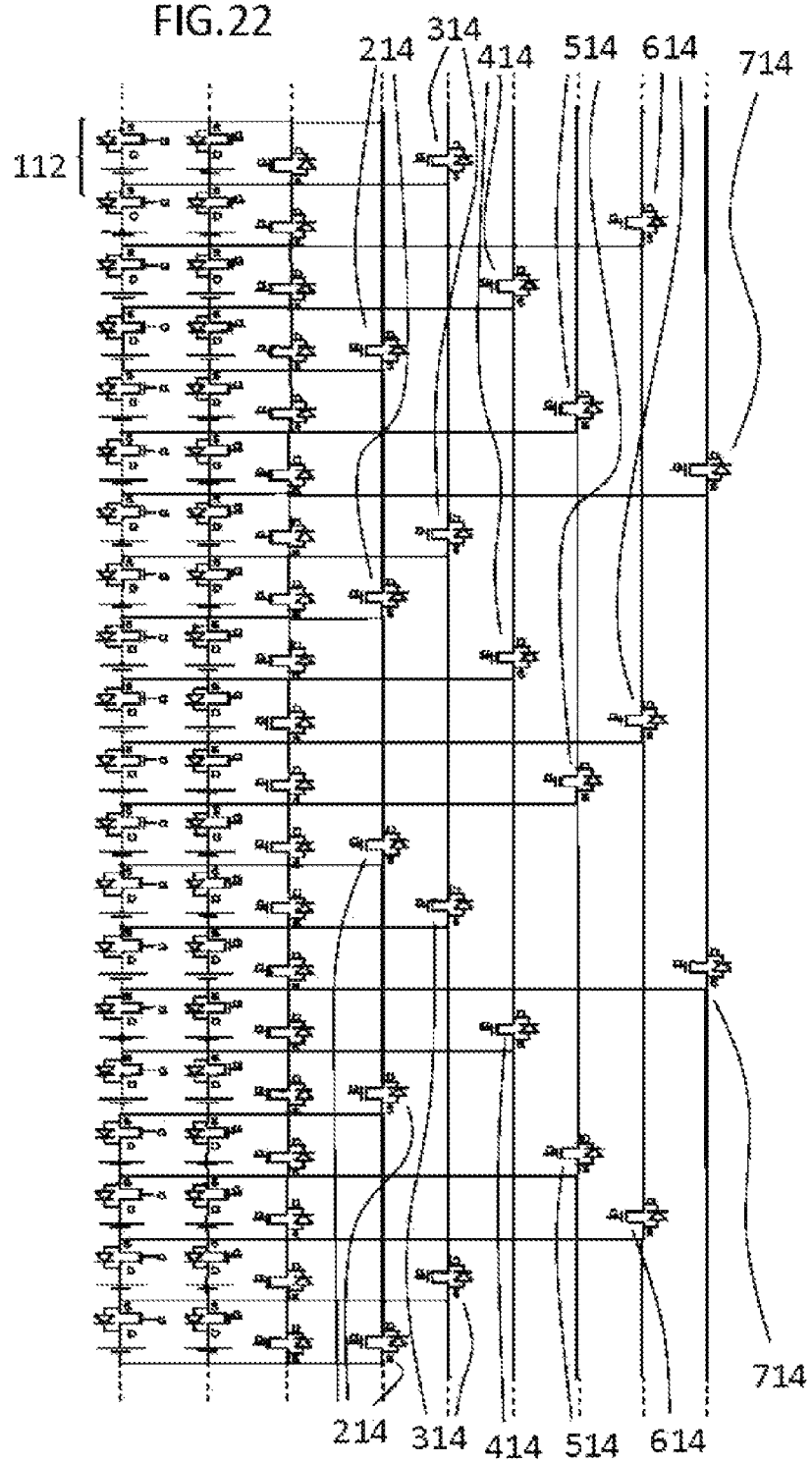
Figure 23:
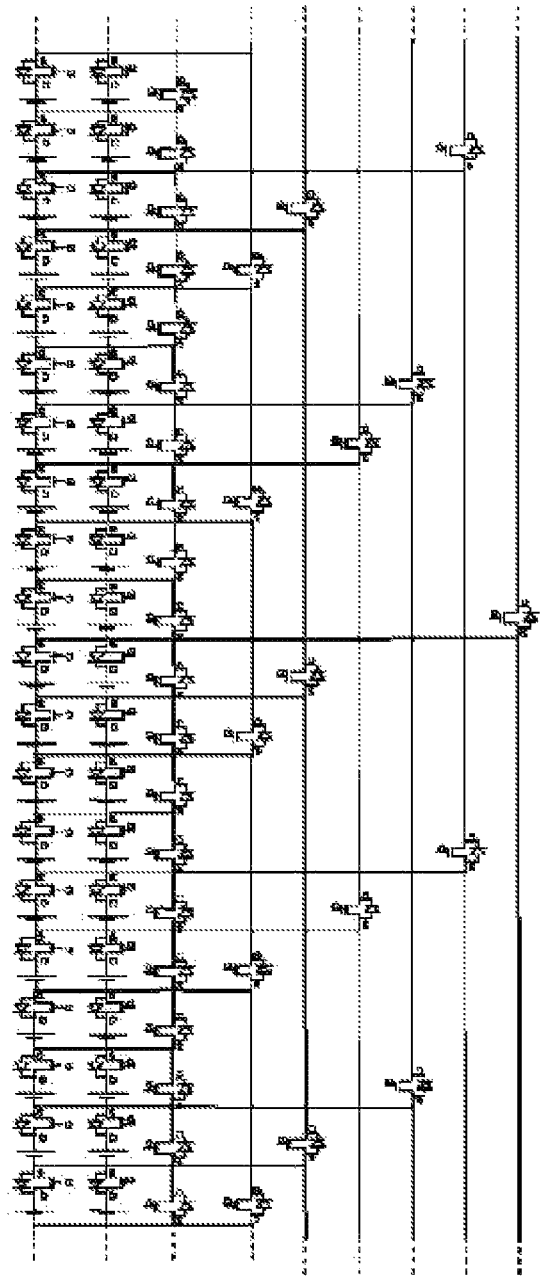
Figure 24:
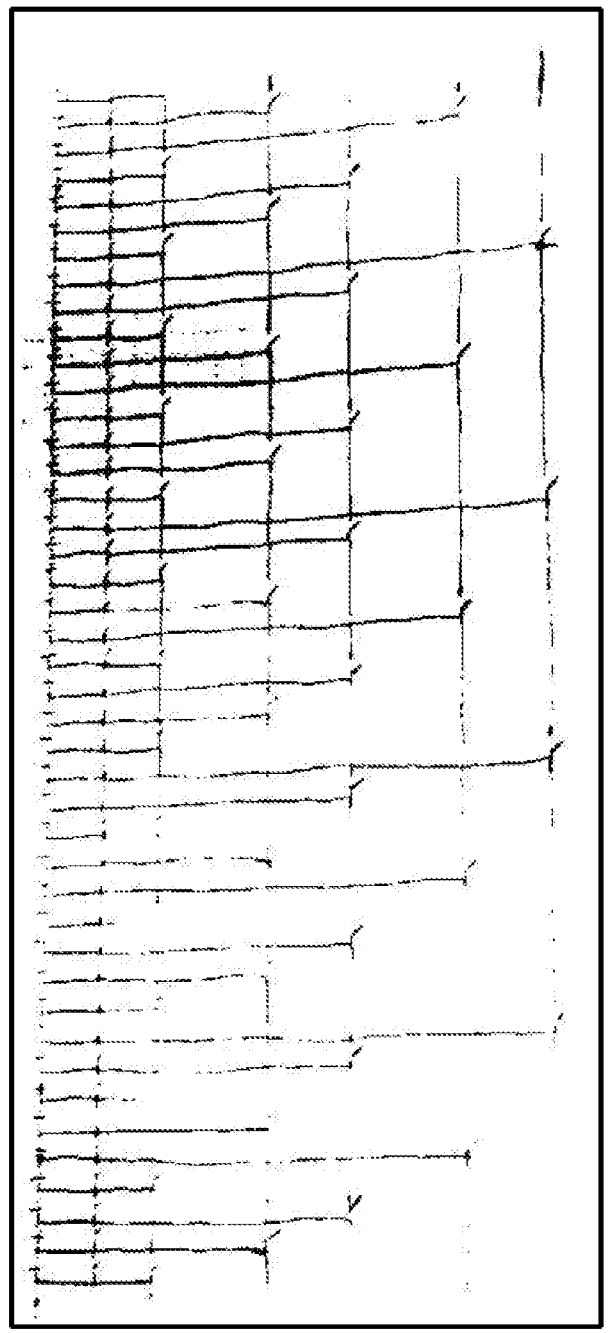

FIGS. 22 to 24 illustrate three variant embodiments of a battery with several distinct parallel switches according to one embodiment of the invention.

Figure 25:
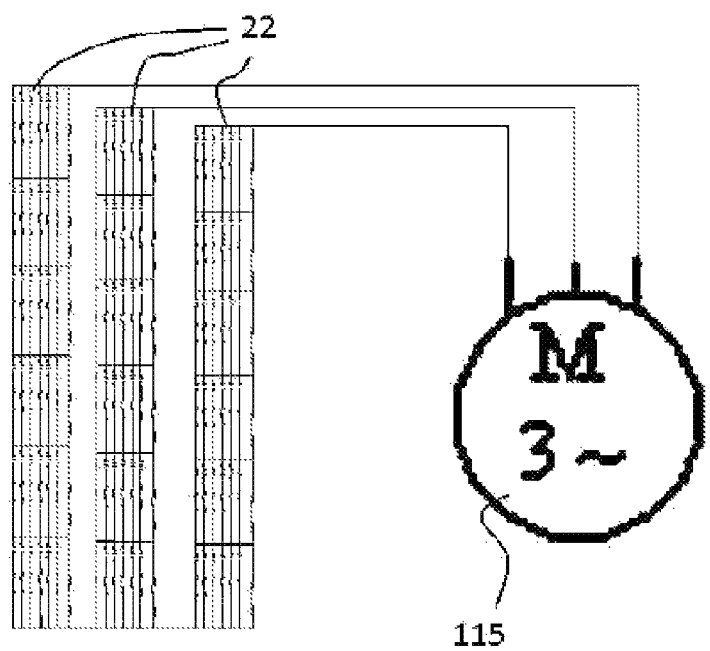

FIG. 25 illustrates a battery adapted for delivering a three-phase voltage.

According to an advantageous aspect of the invention, switches are integrated at the level of all or some of the cells of a battery, to make it possible, by way of a control circuit for these switches, to use or not use certain cells as a function of the needs and measurements performed. The cells are moreover organized in the form of particular groupings, so as to achieve an architecture making it possible to easily dispose cells in series or in parallel, so as to adapt to the need of a load and/or to the state of the cells, and obtain optimization of the battery, an increase in its performance and its lifetime. The battery more advantageously integrates measurement sensors at the level of all or some of the cells or modules.

In the following figures, the same references will be used for identical or similar elements in each embodiment of the invention, for the sake of simplifying the description.

Figure 4:
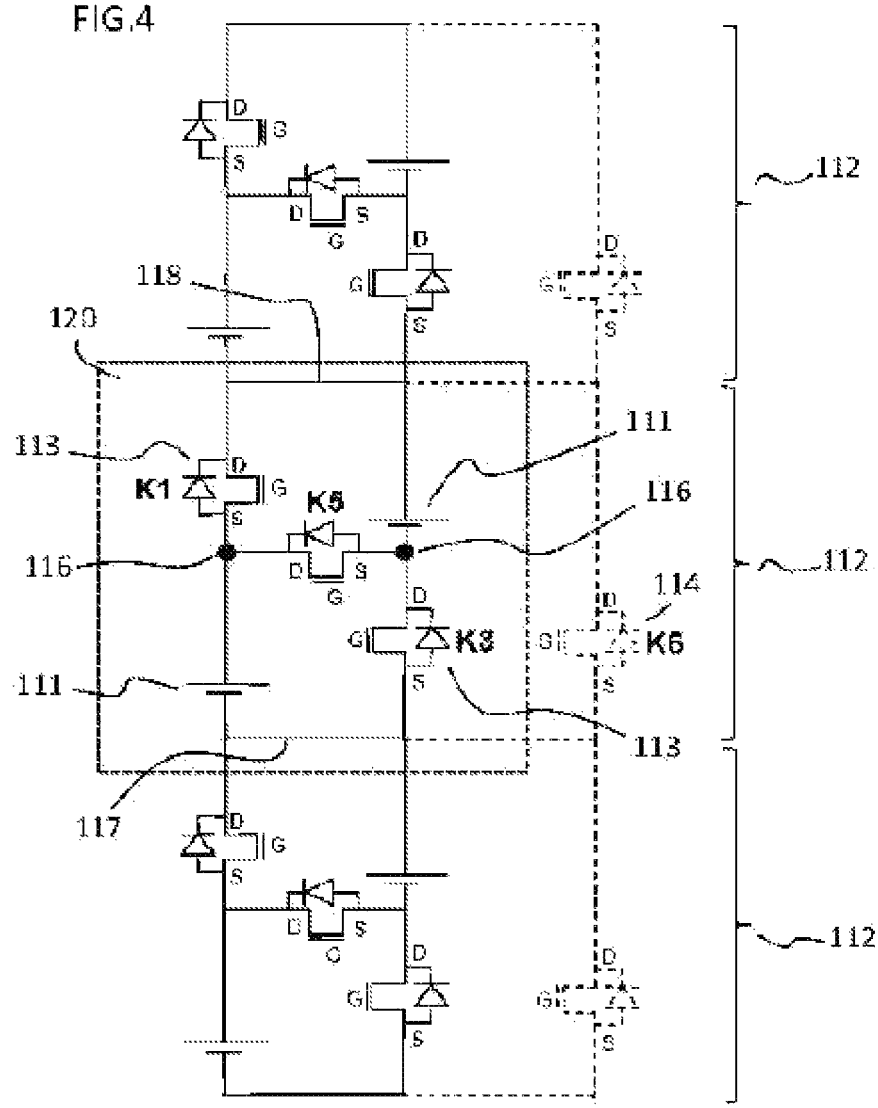

FIG. 4 schematically represents an embodiment of the invention in which a battery comprises a multitude of cells 111 organized as several modules 112.

In this embodiment, each module 112 comprises a lower terminal 117, linked to a lower neighbour module, and an upper terminal 118 for a series link with the upper neighbour module. An H-bridge placed between the terminals 117 and 118 can be used to permute the connections of these terminals 117 and 118 in relation to the upper and lower neighbour modules. Each module is composed of bricks 120 disposed in parallel between its two terminals 117, 118. In this embodiment, each brick 120 comprises two parallel branches extending between its two terminals, lower 117 and upper 118, on which are respectively disposed in the following order from bottom to top: a cell 111 and a switch K1 on the first branch, and a switch K3 and a cell 111 on the second parallel branch. Moreover, an intermediate branch comprising a third switch K5 links the two intermediate terminals 116 disposed on each of the two parallel branches between the cell 111 and the switch K1, K3.

This architecture allows a brick 120 to occupy the following various configurations as a function of the position of the switches:
- if the switches K1 and K3 are closed and the switch K5 is open, then the two cells 111 of the brick are disposed in parallel: this configuration makes it possible for example to obtain maximum current retrieval at the output of the brick;
- if the switches K1 and K3 are open and K5 closed, then the two cells 111 of the brick are disposed in series: this configuration makes it possible for example to obtain the maximum voltage at the output of the brick, and the retrieval of a maximum voltage of a module 112;
- if the switch K5 is open and just one of the two switches K1 or K3 is closed, then just one of the two cells of the brick is active, participates for example in the battery energy retrieval;
- finally, if all the switches are open, the two cells of the brick are disconnected from the remainder of the battery.

It is thus apparent that this architecture allows each brick and therefore each module to provide a single or double voltage, a zero, single or double current, simply by choosing the position of the three switches K1, K3, K5 disposed at the level of the cells of a brick. For this reason, we will subsequently refer to these three switches simply as a "cell switch 113". In a particular case of embodiment, a zero voltage on the module is possible if the switches K1 and K3 are bidirectional in voltage, that is to say with no reverse diode: the zero voltage can then be imposed by the module only via the closing of the optional switch K6.

On the chosen embodiment, each module 112 also comprises a switch K6 114 in parallel with the bricks 120 of the module 112, thus making it possible to short-circuit the module as a whole: accordingly, we shall refer to it subsequently as a "module switch 114". This switch is useful when all the bricks of a module are in the disconnected configuration, so as to preserve an electrical link between the various modules of the battery.

The use of such a battery to power a load, such as a motor, makes it possible to circumvent the intermediate converters used in the prior art. This manner of operation will be explained subsequently.

Figure 5:
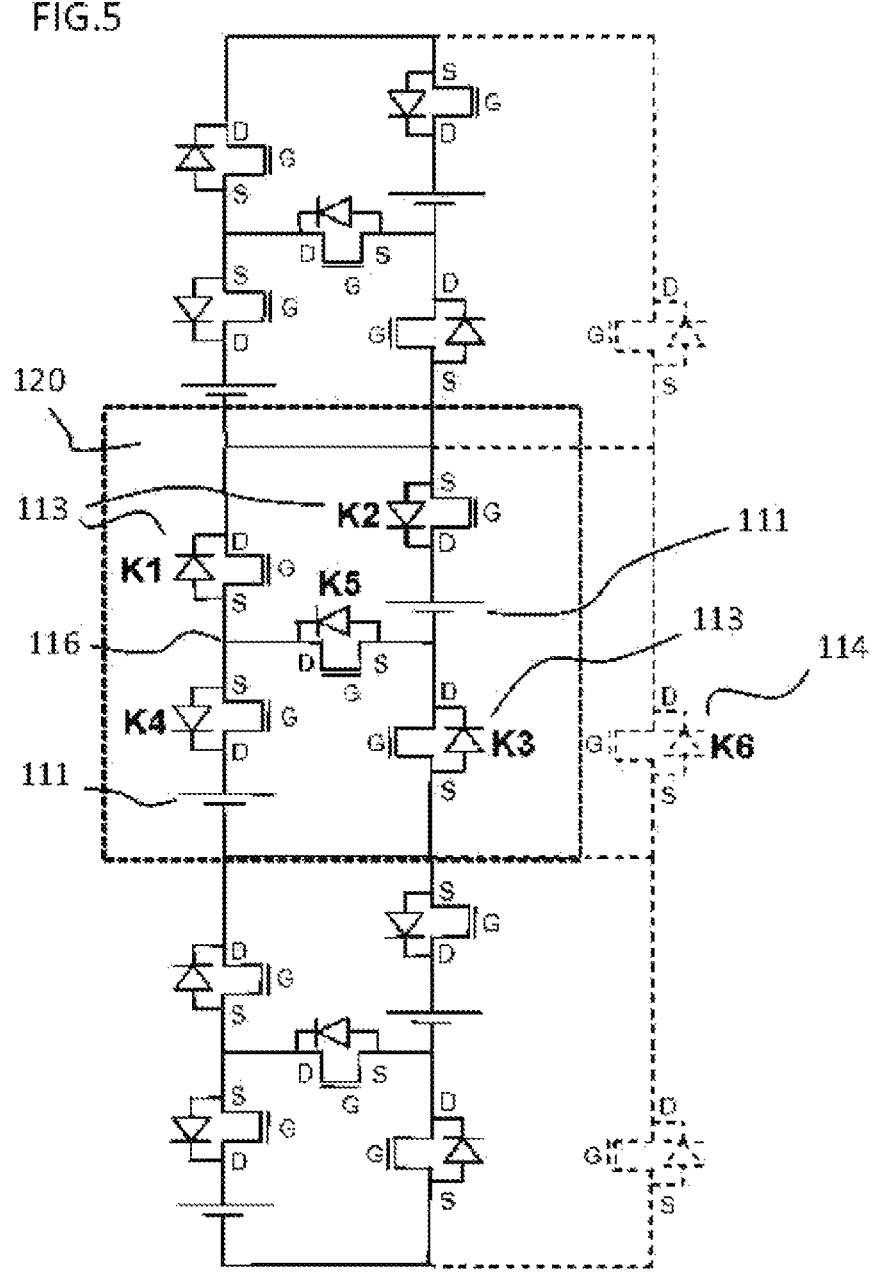
FIG. 5 illustrates a variant of the previous embodiment.

FIG. 5 represents a variant embodiment in which each brick 120 comprises two additional switches K2, K4, disposed on each parallel branch, on the cell 111 side with respect to the intermediate terminal 116. Such an architecture offers additional configurations, in addition to the configurations already explained in relation to the previous embodiment. It makes it possible in particular to impose a zero voltage difference between the two terminals 117, 118 of a module, by closing the three switches K1, K3, K5 and by opening the other two switches K2, K4.

Figure 6:
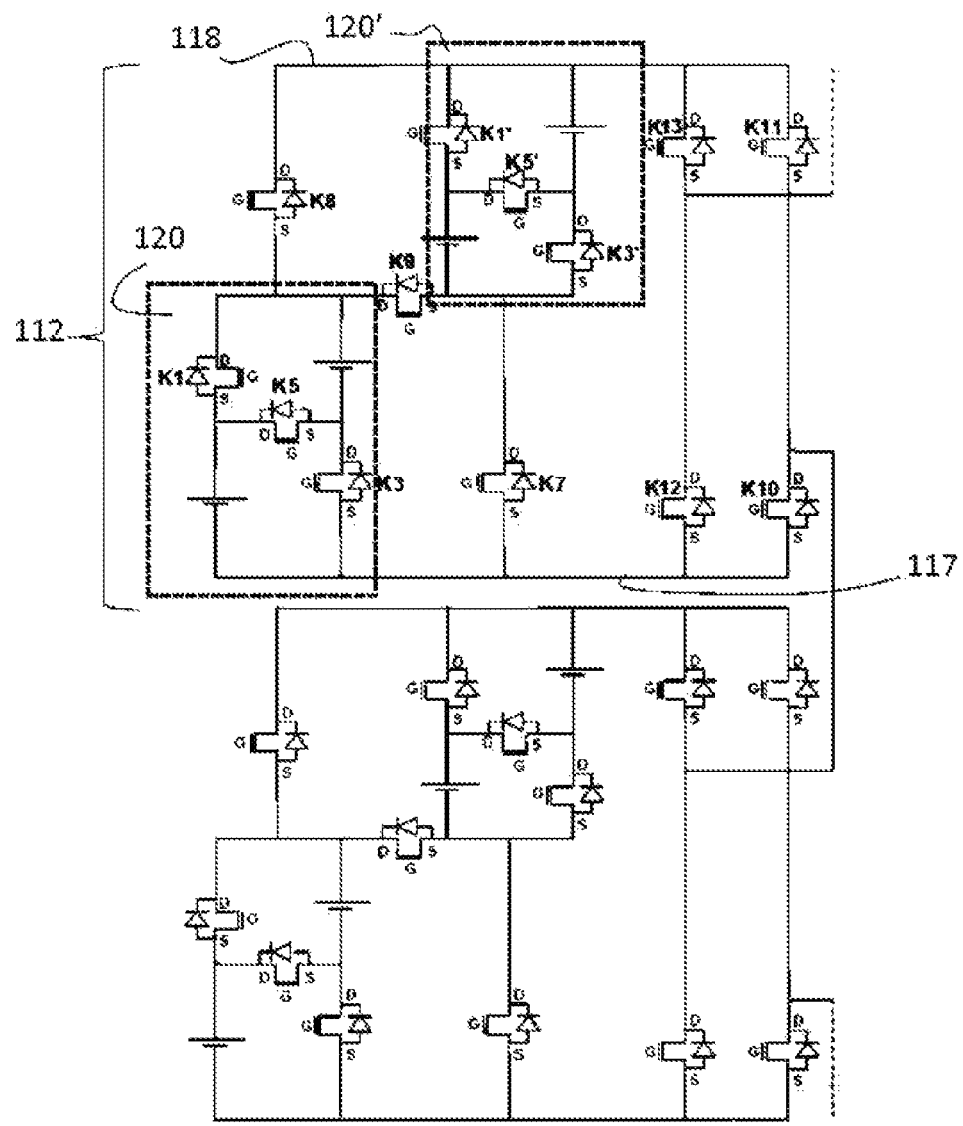
FIG. 6 illustrates another embodiment of the invention.

FIG. 6 illustrates another embodiment in which the bricks exhibited in the previous embodiments are associated two by two in each module 112 so as to allow the placing in series or in parallel of cells four by four, rather than two by two. Indeed, two bricks 120, 120', such as described in the previous embodiments, are linked by three branches and three additional switches K7, K8, K9 disposed respectively between the two lower terminals of the two bricks, between their two upper terminals, and between the upper terminal of the first lower brick 120 and the lower terminal of the second upper brick 120'.

The three additional so-called "intermediate" switches K7, K8, K9 between the two bricks 120, 120' can occupy the following configurations:
- K7 and K8 closed, K9 open: the two bricks 120, 120' are disposed in parallel between the two terminals 117, 118 of the module;
- K7, K8 open, K9 closed: the two bricks 120, 120' are disposed in series between the two terminals 117, 118 of the module.

As the cells 111 of each brick 120, 120' may themselves be situated in series or in parallel, as explained previously, it is apparent that the following configurations are possible:
- the four cells 111 can be situated in parallel between the terminals 117, 118 of the module;
- the four cells 111 can be situated in series between the terminals 117, 118 of the module;
- two sets of two cells in parallel can be situated in series;
- two sets of two cells in series can be situated in parallel;
- a set of two cells in series can be situated in series with a set of two cells in parallel.

As a remark, four additional switches K10, K11, K12 and K13 are disposed between the terminals 117 and 118 of the module, so as to be able to invert or cancel the output voltage of the module. These switches thus form an H-bridge. The cancellation of the output voltage is done by closing the switches K10 and K12 or K11 and K13, thereby avoiding the use of the module switch K6 proposed in the embodiment of FIG. 5 and the necessity for the switches K1, K3, K1' and K3' to be reversible in voltage. In fact, it is thus possible to impose a zero voltage at the output of the H-bridge even if the voltage between the terminals 117 and 118 is not zero.

It is thus apparent that this architecture allows each module to provide a zero, single, double, triple, quadruple, negative single, negative double, negative triple, negative quadruple voltage, a zero, single, triple or quadruple positive or negative current, simply by choosing the position of the thirteen switches K1, K3, K5, K1', K2', K3', K7, K8, K9, K10, K11, K12 and K13 disposed at the level of the cells of a brick.

Figure 7:
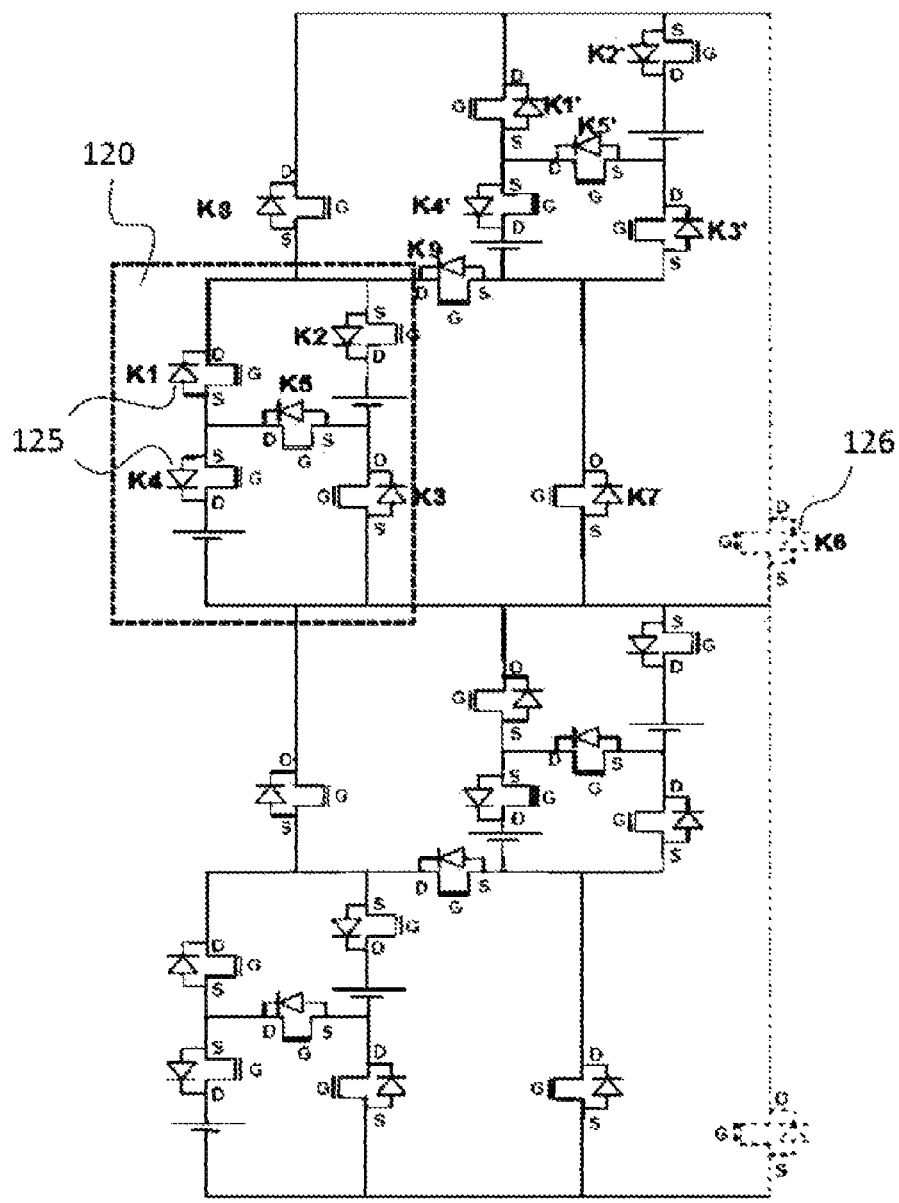
FIG. 7 illustrates a variant of the previous embodiment.

FIG. 7 represents a variant of the previous embodiment, in which each brick 120 comprises five cell switches 113 K1, K2, K3, K4, K5, in a manner similar to the embodiment illustrated in FIG. 5. Moreover, the modules are simply disposed in series, without the switches K10 to K13 envisaged in the previous embodiment.

Figure 8:
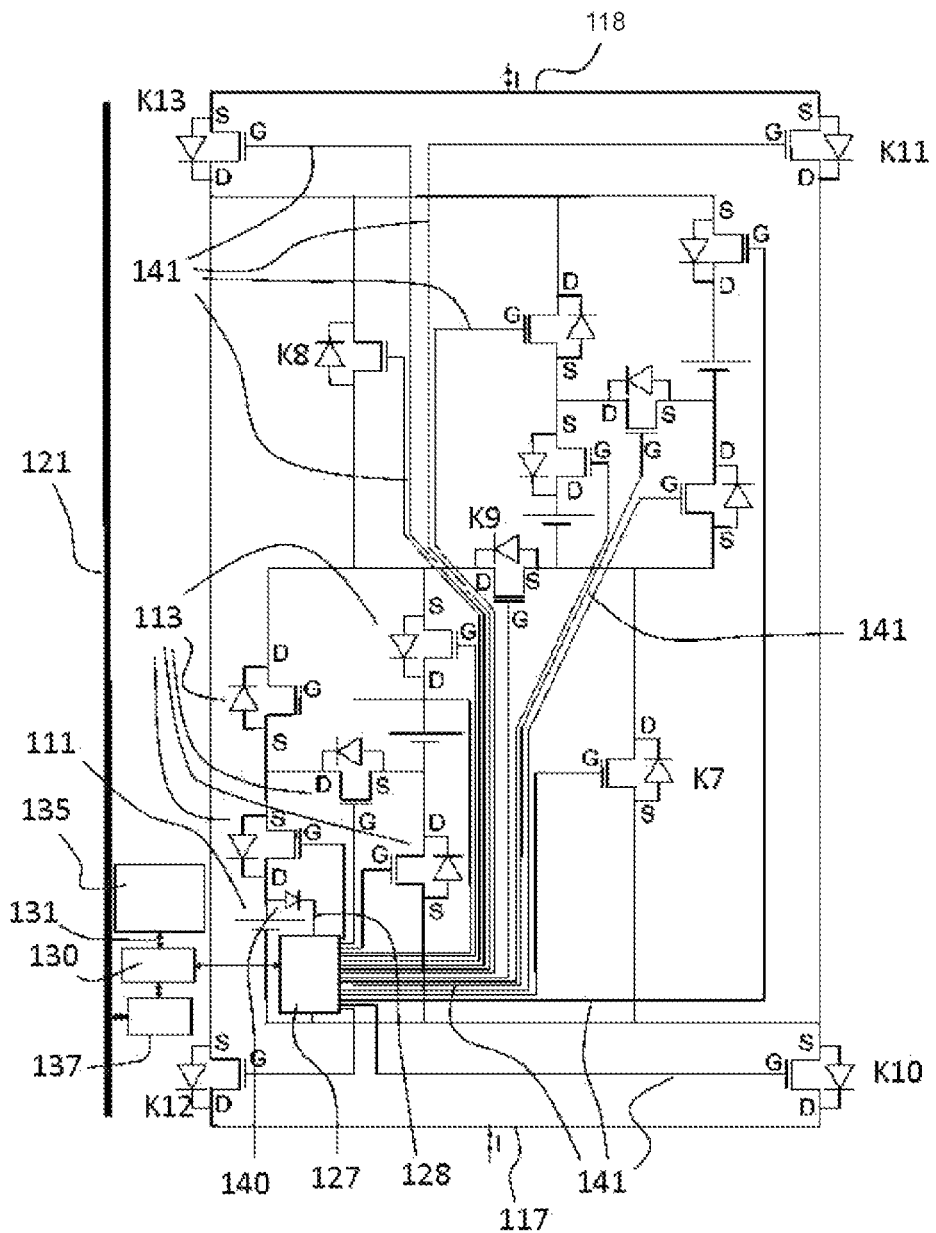
FIG. 8 illustrates the management elements of the variant of the previous embodiment.

FIG. 8 shows in a schematic manner the architecture provided for at the level of a module for the management of such a battery. This same management architecture can readily be implemented on all the other embodiments of the battery.

One or more measurement sensors, not represented, for measuring for example the temperature, the voltage and/or the current, are envisaged for each cell of the module 112 and communicate their measurements to a measurement unit 135. The measurements performed by this or these sensors are transmitted to a local processing circuit 130, via a multiplexer for example, by communication pathways (not represented). The processing circuit 130 thus receives these data through a communication pathway 131 performing a digitization, of "ADC input" type; or as a variant, these signals arrive already digitized, this digitization being carried out at the level of the multiplexer. According to a possible embodiment, the processing circuit 130 can be a microcontroller having a sufficient input/output number to interrogate the set of sensors. All the transistors used to form the cell switches 113, to form the device for placing the bricks of the module (K7, K8, K9) in series/parallel, and to form the device for inverting the output voltage of the module (function of H-bridge type) (K10 to K13), are driven by a power control circuit 127 which transmits control signals 141 to them, under the orders of the processing circuit 130. Finally, the latter is linked to a central computer by a communication bus 121 and by way of an interface 137 forming a galvanic isolation.

All these components associated with a single module are supplied locally, that is to say by the voltage of at least one of the cells 111 of the module 112, or indeed of a neighbour module. By way of example, the control circuit 127, generally referred to as a "driver", is supplied electrically by a link 128 allowing it to recover a voltage difference corresponding substantially to the voltage of the closest cell, slightly decreased by a voltage drop (for example close to 0.6 V) at the level of a diode 140 disposed on the link 128.

As a variant, not represented, the control circuit 127 is supplied electrically by links 128 with several cells of the module, allowing it to recover a voltage difference corresponding substantially to the voltage of the most charged cell, slightly decreased by a voltage drop (for example close to 0.6 V) at the level of the diode 140 disposed on the links 128.

Figure 9:
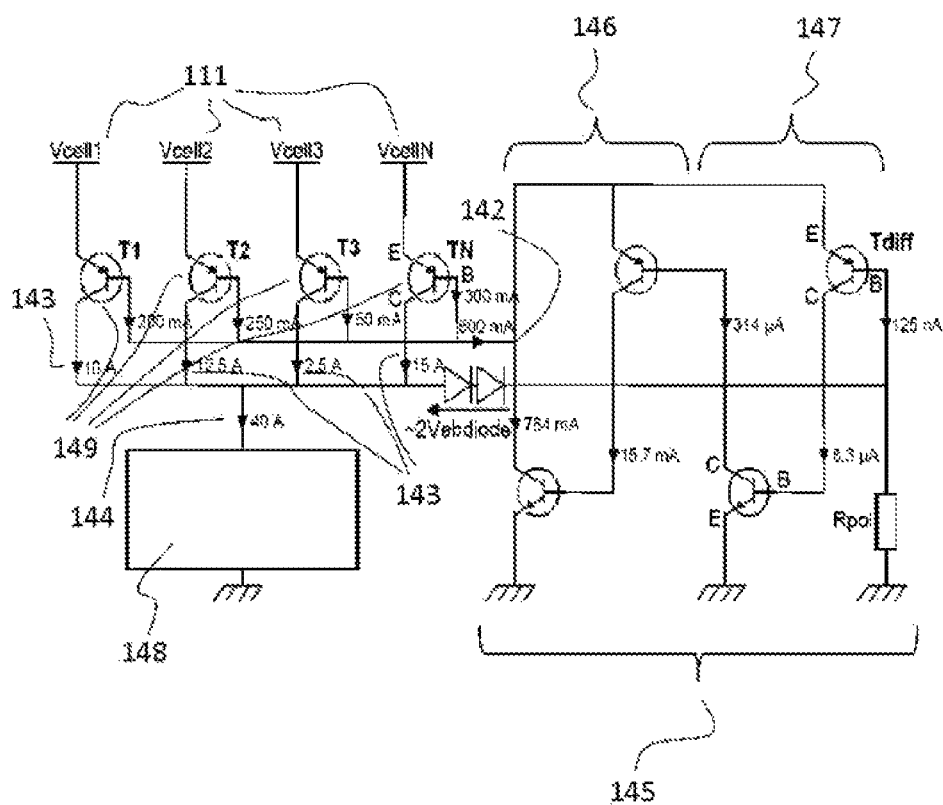
FIG. 9 represents a variant for the embodiment of a local power supply of the management elements of the embodiments of the invention.

FIG. 9 illustrates a variant embodiment of the previous electrical layout to make it possible to obtain a local power supply for the electronic components of a module on the basis of the voltage stored by the cells of the module considered, or indeed of a neighbour module. For the sake of simplification, the electronic components are not detailed, but they comprise at least one control circuit and switches, as explained hereinabove. In this variant, a bipolar PNP transistor 149 is associated with each cell 111 of the module. All these transistors 149 are controlled by one and the same current of a terminal 142 of a control device 145. This results, at the output 143 of each transistor, in a current whose intensity depends on the voltage of each cell 111, that is to say the charge and state of health of each cell 111. These currents are added together so as to supply the electronic components with a resulting current 144. The control of the transistors 149 is such that the final supply current 144 attains a desired value. The solution makes it possible to invoke the various cells of the module as a function of their state, of their available voltage.

This solution avoids moreover having the voltage drop between the voltage available at the level of the module and that actually utilizable by the electronic components, as in the embodiment described hereinabove by reference to FIG. 8, on account of the use of the diode 140. This voltage drop may in particular be troublesome in an embodiment for which the cells were low-voltage cells, of value 1.5 V for example.

The control device 145 comprises an amplification device comprising two amplification stages 146 and 147 according to this embodiment to make it possible to implement the control of the supply device described hereinabove without requiring too considerable a power, which would bring about a voltage drop at the level of the module, this being avoided in this embodiment. Accordingly, a first very low current is tapped off from the module, at the level of a first transistor Tdiff, and then amplified by an amplification cascade, to attain the desired control value on the terminal 142. The control current on the terminal 142 adjusts itself automatically as a function of the demand in current of the electronic components 148, thereby limiting it to what is strictly necessary and in real time and thus limiting the mean consumption related to this control.

The numerical values illustrate an exemplary implementation making it possible to attain a supply current of 40 A by tapping off a current of 125 nA for its control.

If it is desired to power electronic components of the battery on the basis of cells that may be placed in series, that is to say potentially disconnected from the low potential 117 of a module to which they belong, and that can rise to a relatively high potential with respect to the voltage need of these components to be powered, then depletion NMOS transistors can be placed between the high potential of the cells and the bipolar transistors 149. These transistors have the property of opening when the gate-source voltage Vgs is negative and becomes, in absolute value, greater than a threshold which depends on the type of transistor used. By choosing a depletion transistor, whose threshold voltage corresponds substantially to the desired supply voltage of the electronic component or more broadly of the circuit that it is desired to power, and by connecting the source of this transistor on the bipolar transistor side and its gate to the low potential of the terminal 117 of the module, then the transistor will have a tendency to open as soon as the source voltage (on the bipolar side) tends to be greater than the threshold.

The function of the control circuit 127 is to generate control signals 141 towards the various transistors of the module to actuate them, thus fulfilling a function of control of the switches. In a similar manner and not represented for the sake of the clarity of the figures, all the electronic components of the module can be supplied according to the same solution, such as the processing circuit 130 making it possible to estimate the state of the switches, an optional communication system, etc.

As has been described, each module 112 of the battery has its own inherent intelligence by virtue of its processing circuit 130 and thus participates in the battery management method, in cooperation with the central computer 122 which drives the set of modules. This computer will be described in greater detail subsequently, by reference to FIG. 19.

Moreover, according to an advantageous embodiment, all the power components associated with a module are supplied directly by the voltage available at the level of the corresponding module, in particular the control circuit 127 for the transistors, as was described previously. Such a control circuit, supplied by its associated module, is then electrically isolated from the other modules and/or from the electrical potentials outside the module. Such an embodiment presents the advantage of eliminating the risk of driving a certain transistor with a very different potential from that of the stage, which could lead to its destruction or to its short circuiting. Moreover, this solution affords the additional advantage of allowing a reduction in the connections between the components of the control circuit and the power supply source, since it is possible to group them together a short distance from one another and from the voltage source, in particular by positioning the transistors as close as possible to the cells to be connected. Finally, the use of very short connections also greatly reduces any risk of short-circuit, for example between two modules.

Thus, according to the advantageous embodiment described hereinabove, all the switches Ki internal to the structure of the battery are driven by a control circuit 127 supplied by at least one cell of the battery itself, that is to say supplied locally, without recourse to an outside power supply. Moreover, the driving of a switch is preferably carried out by a sufficiently close control circuit, supplied by at least one cell of the closest module or one in proximity, so as to involve voltages of one and the same order of magnitude between the control circuit and the driven switch, for example the driven transistor. Accordingly, it is advantageously chosen to drive a switch, one of whose terminals, source or drain in the case of an NMOS transistor for example, is linked to a voltage of a certain module by a control circuit supplied by this same module or an adjacent module, more exactly by at least one cell of one of these modules. More generally, it will be possible to choose any control circuit whose power supply link is situated on a module whose potential difference with the terminals of the switch does not exceed a predefined threshold, which would run the risk of damaging the switch, of creating a situation of electrical risk. This threshold is defined by safety standards and depends on the type of switch implemented. This local, proximity, power supply, exhibits the second advantage of allowing the use of drive links of short length between the control circuit and the switch.

Thereafter, it should be noted that the control circuit must allow reliable actuation of the various switches. In a case where the various modules exhibit a potential difference of 3 V and the switch to be controlled is of NMOS type, a control circuit preferably integrates a voltage-booster such as a charge pump to increase the voltage of 3 V present on its input terminals, and provide as output a higher voltage for the actuation of the switches, as a function of the latter. In the case of an NMOS transistor for example, it will be chosen to supply its gate with a voltage such that the voltage difference between its gate and its source is of the order of 10 to 20 V inclusive, to guarantee reliable actuation.

Moreover, a communication device supplied by the stage can make it possible to communicate with the other stages and/or with a central system via a heavily insulated strap so as to avoid electrical risks (short circuits between stages, impairment of the central system placed at a potential very different by a few kV from that of a stage of the battery, electrical risk for the repairer). In contradistinction to a pulse transformer which would make it possible to control the power transistors across a galvanic isolation, the use of a communication device supplied by the module makes it possible to interpret the signals received (decoding of the address, of the information), to code the signals to be transmitted and to pool the communication lines whereas the pulse transformer only allows the power transistor to be turned "on" or "off" with a connection line individualized for each transistor. The communication device can be for example an I2C interface present in numerous microcontrollers, that is linked to a pooled communication bus at each stage via a galvanic isolation.

In the example described hereinabove, the battery management method is implemented by the cooperation of a local processing circuit 130, disposed at the level of each module, and of a central computer 122. The set of battery management functions will therefore be able to be implemented by this combination. Several embodiments can thus be contemplated, by transferring certain management functions from the local level to the central level or vice versa.

The various switches Ki are embodied with the aid of power transistors, preferably transistors of NMOS type, which afford a gain in conductivity in their passing state with respect to PMOS transistors which could as a variant be used. As a variant, it is also possible to use other types of transistors such as bipolar, FET, JFET, IGBT, etc., or else transistors based on GaN, SiC, etc. It is also possible to place several transistors in parallel to better ensure the passage of the current.

As has been seen, each brick 120 comprises between 3 and 5 cell transistors 113 and at least two cells 111, and as an option a module transistor 114. All these transistors are associated with diodes 125, 126 mounted in parallel, for example visible in FIG. 7, which are integrated into the transistors if they are NMOS discrete power transistors or as a variant are distinct diodes, to represent their characteristic of allowing the current to pass in the reverse direction.

Figure 10:
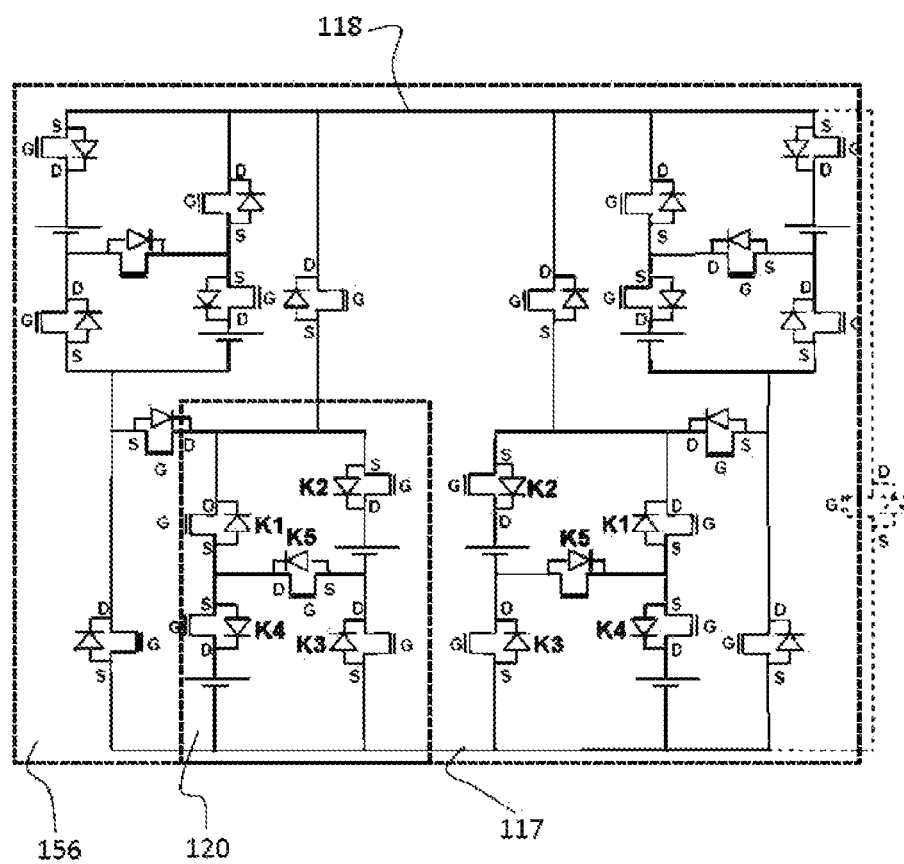
FIGS. 10 and 11 illustrate two variants of another embodiment of the invention.

FIG. 10 illustrates another embodiment of a battery of which a module 112 comprises a novel basic element which consists of an association of four bricks 120 such as presented previously, forming a basic structure, which we will refer to as a "superbrick" 156. This superbrick comprises a first brick linked to the lower terminal 117 of the module, and linked to a second brick linked to the upper terminal 118 of the module by way of three switches K12, K13, K14 making it possible to dispose these two bricks in series or in parallel, according to a manner of operation explained previously. This same association of two bricks is disposed between the two terminals, lower 117 and upper 118, of the module in parallel with the two bricks described previously. These four bricks form a superbrick, which serves as the basis for the architecture of the battery. The latter therefore comprises a multitude of other superbricks, not represented, disposed on the same module in parallel with the superbrick illustrated and/or on the other modules. This superbrick offers a multitude of possibilities for arranging eight cells, either all in parallel, or in two parallel branches of four cells each in series, or according to intermediate configurations such as four parallel branches of two cells each in series for example.

Figure 11:
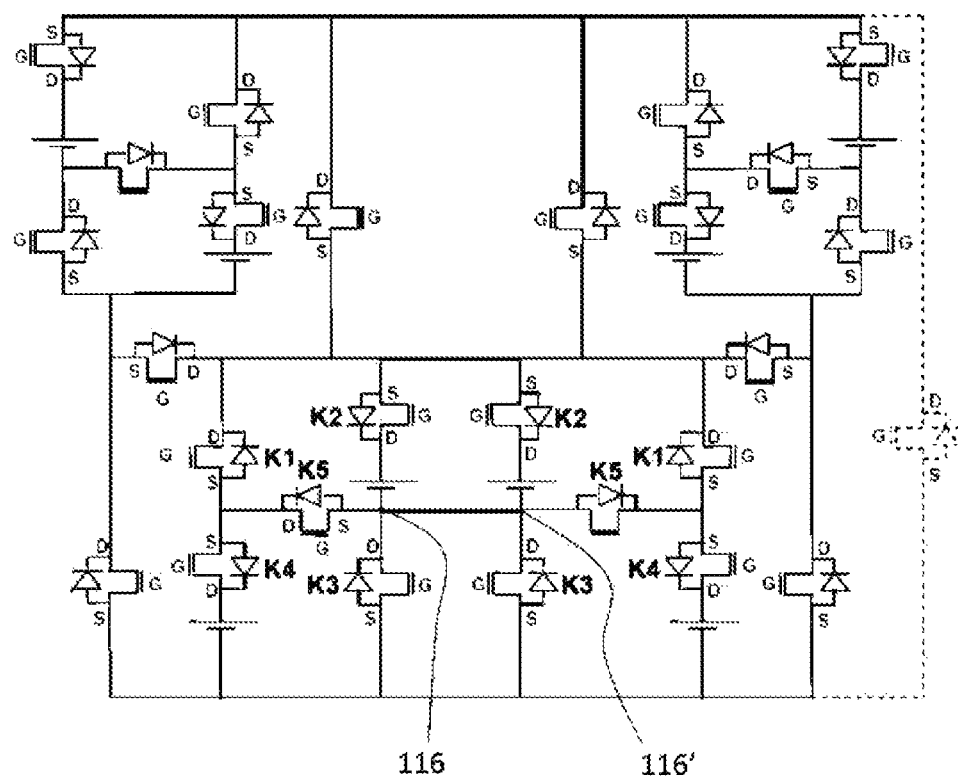

FIG. 11 presents a variant of the previous embodiment in which two intermediate terminals 116, 116' of the two lower bricks of the superbrick are linked, as are the two upper terminals of these same two bricks. This configuration offers the additional possibility of placing a cell of one of the two lower bricks in series with a cell of the other brick for example.

As a variant, other electrical links between the terminals of the four bricks of the superbrick can be implemented, such as a link between intermediate terminals of the two upper bricks, in a manner similar to the layout chosen for the two lower bricks, and/or a link between the other intermediate terminals of the two lower bricks, etc.

The manner of operation of a battery such as represented will now be explained. During its use in a charge retrieval function, to supply for example a motor in a customary operating configuration, at least one of the cell switches 113 is closed, whereas the module transistor 114 is open, thereby allowing one or more cells 111 to deliver a voltage and a current which passes through the closed transistors and which will ultimately contribute to the motor power supply. A current then flows from the lower terminal 117 to the upper terminal 118 of each module of the battery (or indeed in the opposite direction if the load exhibits for example a reactive power). On the other hand, if all the cell switches are open and the module switch 114 is closed, the current will pass through this module switch and the cells of the module are isolated, do not participate in the generation of supply current. In the case where all the switches 113, 114 are open, the current consumed, that is to say the battery discharging current, will pass through the reverse diode 126 associated with a module switch 114, and the voltage across the terminals 117, 118 of the module remains equal to about −0.6 V (the voltage of the upper terminal 118 is about 0.6 V lower than that of the lower terminal 117: this voltage drop originates from the reverse diode 126 associated with the transistor forming the module switch 126). Finally, this avoids closing cell switches 113 randomly while the module switch 114 is also closed, so as not to short circuit a cell 111, for safety reasons, unless this is desired in order to rapidly evacuate the energy of a cell whose temperature might rise too much or that might have begun to catch fire.

Moreover, a battery such as illustrated previously is also suited to a cells recharging mode of operation, in which the current is reversed and flows from the upper terminal 118 to the lower terminal 117 of each module of the battery. In the normal situation, the cell switches 113 are in a position which allows a current to pass through the cells 111 so as to recharge them. On the other hand, if cells are disconnected from the battery, for example if all the cell switches 113 are open and the module switch 114 is closed, the current will pass through the module switch and the whole of the module is then isolated, is not recharged. In the case where all the switches 113, 114 are open, a current will pass through the reverse diodes 125 associated with the transistors forming the cell switches 113 (K4, K5, K2, K9, K4', K5', K2' of FIGS. 4, 5, 6, 7, 8, 10 and 11), for placing them in series or parallel more precisely, and the voltage across the terminals 117, 118 of the module considered remains equal to that of the cells of the module placed in series (for example 4*3.3=13.2 V) increased by the voltage across the terminals of the diodes 125 (for example +3*0.6 V in the case of FIG. 6). Finally, in this recharging phase, this likewise avoids positioning the switches 113, 114 in a configuration which would short circuit a cell 111, for safety reasons, unless this is desired in order to rapidly evacuate the energy of a cell whose temperature might rise too much or that might have begun to catch fire.

It is beneficial to note that the voltage of a module remains low, even when all the switches are open, thereby making it possible to use relatively inexpensive transistors supporting relatively low voltages to fulfil the switch function, and whose resistance in the passing state is very low, thereby inducing few losses. This will in particular be the case if the cells 111 exhibit a voltage of less than 40 V.

According to the embodiment of the invention, each cell comprises moreover at least one sensor for measuring a magnitude characteristic of the state of the cell. This measurement sensor can for example measure the voltage and/or the intensity and/or the temperature at the level of the cell concerned. Each measurement sensor is moreover linked by a communication device to an intelligent device, local and/or remote, such as a computer of microcontroller type, which receives the measured values and implements a battery management method, which will be described in greater detail subsequently, to determine a mode of optimized operation of the battery, by taking account of the measurements performed.

This optimized operation in fact consists in determining the switches Ki which must be open and closed. This configuration of the various switches of the battery can be modified in real time. This solution thus makes it possible for example to discard the defective or overheated cells, to steer the current within the very heart of each module, to balance each of the cells of the battery in real time. As a remark, the mean current demanded by a load powered by the battery is in general much lower than the peak current demanded during heaviest consumption, thus allowing the battery to operate satisfactorily most of the time with a relatively considerable number of disconnected cells, or indeed of disconnected modules, if the whole of a module is considered to be defective or overheated for example.

Figure 12:
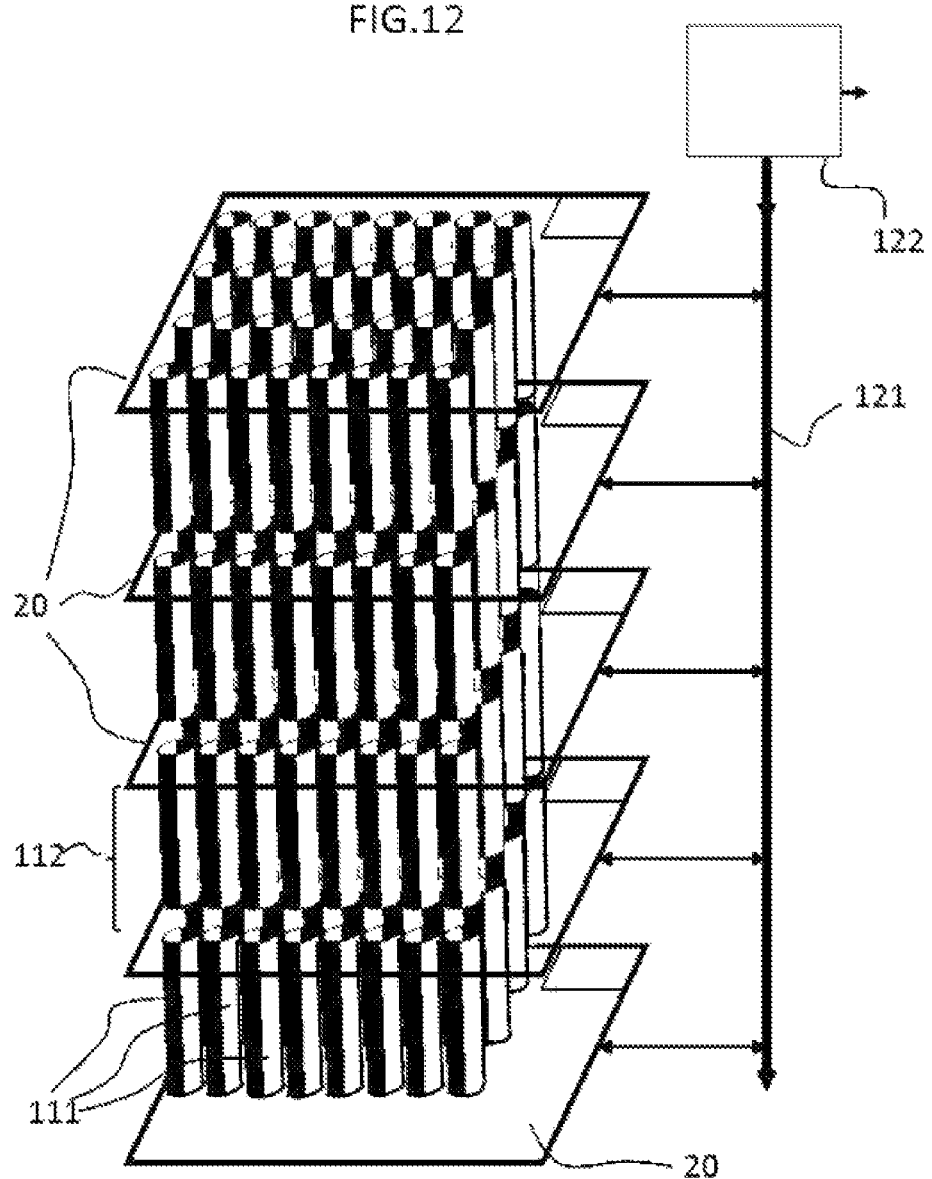
FIG. 12 represents the physical implementation of the electrical functions of the invention in the architecture of a battery according to one embodiment of the invention.

FIGS. 12 to 14 represent possible examples of physical embodiment of the electrical functions added by the invention to the architecture of a battery according to one embodiment of the invention.

FIGS. 12 and 13 illustrate an embodiment in which an electronic card 20, which comprises the components explained previously, in particular by reference to FIG. 8, is added for each module of the battery. This electronic card takes the form of a printed circuit positioned on the lower or upper face of each module. Thus, the battery comprises an electronic card 20 between each module.

Thereafter, according to the embodiment represented in FIGS. 12 and 13, each electronic card is linked by a communication bus 121 to a central computer 122, which receives the measurements performed locally within a module of the battery and implements a method for managing the battery, comprising in particular the transmission of commands for opening and/or closing the switches of the battery. This transfer of data by the communication bus 121 may require optional multiplexing and digitization of the data, as well as galvanic isolation (by transformer or optocoupler). Moreover, a control circuit 127 is placed on each electronic card and constitutes an intermediate element between the computer 122 and the switches, allowing the adaptation of the voltage transmitted to the transistors forming the function of switches Ki for the implementation of the commands of the computer. These control circuits 127 may moreover integrate safety functions to avoid for example any short-circuit.

FIG. 13 more precisely illustrates the components present on each electronic card, which comprises measurement sensors 29, to measure the temperature, the voltage, and the current, one or more processing circuits 130 to estimate the charge level of each cell for example, determine the relevance to use or not use each cell, etc. The electronic card 20 comprises moreover a control circuit 127 allowing the actuation of the various transistors forming the switches 113, 114. Finally, it comprises a communication interface linked with the communication device so as to communicate with the central computer 122.

FIGS. 14a and 14b illustrate a variant embodiment in which the electronic functions of each electronic card of the embodiment described hereinabove are grouped together on a single electronic card 20, on which the bricks are disposed. FIG. 14a represents a view from above, making it possible to see the distribution of the modules 112 on the card 20, whereas FIG. 14b represents a rear perspective view, making it possible to distinguish various cells 111, as well as certain electronic components, represented summarily in a non-exhaustive manner so as to simplify the representation of the electronic card 20. However, the latter comprises all the components explained previously. The communication bus 121 extends over the entire length of the card as far as the central computer 122, positioned towards a free end of the electronic card 20. This communication bus 121 can be physically isolated from the electronics of the modules by establishing a printed-circuit strip dedicated to the communication bus, separated from the electronic components of the various modules, by separating for example their earths, and/or by retaining a safety distance between the two parts. Only the communication elements between these two parts, such as transformers or opto-couplers, will remain straddling these two parts to ensure communication while guaranteeing galvanic isolation.

According to a second variant embodiment not represented, the battery management method is implemented solely locally, at the level of each module, or indeed cell. This presents the advantage of allowing more reactive driving of the various switches, to avoid the obligation to envisage galvanic isolation between the electronic cards 20 and a central computer 122 and a complex coding of the information to be transferred. In such an embodiment, a temperature sensor, a voltage sensor and a current sensor are for example arranged at the level of each cell. The measurements performed by these three sensors are transmitted to a processing circuit via a multiplexer by respectively three communication pathways, or as a variant by one and the same pooled pathway. The processing circuit thus receives these data at the level of a communication input performing a digitization, of "ADC input" type. According to a possible embodiment, the processing circuit can be a microcontroller having a sufficient input/output number to interrogate the set of sensors. All the transistors forming the switches Ki are driven by a control circuit, under the orders of a processing circuit.

As a remark, it is ultimately possible to carry out embodiments with various numbers of electronic cards 20, a card being able to contain the electronic circuits of the invention for one, two, or any number of modules. Moreover, it is also possible to envisage other embodiments in which only some of the electronic components presented previously are present, on an electronic card or otherwise, or in which certain components are shared between cells and/or modules. For example, a control circuit for switches can be shared by several neighbour modules, so as to preserve an acceptable voltage supply.

In all cases, the electronic cards 20 are advantageously disposed so as to dispose their terminals for connection with the cells 111 as close as possible to the terminals of the cells so as to reduce to the maximum the length of the connections and therefore the associated losses. Likewise, on the printed circuit of the electronic card, the power paths are as short as possible with the highest possible conductor cross-section.

To increase the conductor cross-section, it is possible to strengthen the tracks of the printed circuit by soldering above a trim or conducting wire. FIG. 15 illustrates such a solution, in which an electronic card 20 of printed circuit type is superposed on a module of several cells 111. In this figure, only two modules of two cells are represented, for the sake of clarity of the figure, but the battery comprises more than two modules each having more than two cells. As a remark, such a strengthening can fulfil the second function of evacuating the heat generated, in particular that dissipated by the power transistors; accordingly, its shape can exhibit a surface favouring this function, in the manner of a convector or radiator. Connectors 16 are rigged up on this board, so as to link the cells electrically to the electronics of the card (for example cells whose positive and negative terminals pass through the card and clamp the card and the strengthened power tracks via a nut which is screwed onto the terminals of the cell. A relatively elastic washer can be added between the card and the nut to compensate for the effects of thermal expansion and ensure good electrical contact over the duration. As a variant, simple soldering can ensure electrical contact between the terminals of the cell and the power tracks of the PCB card). As is apparent in the figure, electrical conducting strengtheners 19 are added to the tracks of the printed circuit. These strengtheners also represent a potential thermal radiator soldered and/or glued to the tracks. As a supplement, holes, not represented, can be made through the electronic card 20 to facilitate the circulation of air and the cooling of the cells 111 and electronic components.

FIG. 16 illustrates a possible implementation of a battery of architecture such as presented previously, in which the battery comprises several modules 30a to 30x, each comprising respectively N1 to Nx switchable cells in series, or in parallel, or partially in series and parallel via an assemblage of bricks 120 as has been described previously, with the aid of an optional H-bridge, linked together in series by links 31, to provide an output voltage $V_{out}$. Each module is linked to a central computer 122 by a communication bus 121, with which it exchanges data through communication links 32 and receives in return commands 33 from the computer. These commands comprise in particular the number of cells a to iv to be placed in series respectively for each module, or optionally the exact configuration of all the bricks of each module, from among the possible series and parallel combinations. In the case where the module receives just the number of cells to be placed in series (zero, single, double, triple, quadruple voltage, etc. with optionally the sign in the presence of an H-bridge in the modules), it defines the cells to be placed in series and in parallel as a function of their state of charge, health or other criteria, and of the current demanded so as to attain the voltage demanded. This makes it possible to obtain the desired output voltage $V_{out}$ and desired output current $I_{out}$. The electrical output values are measured by a monitoring unit 135, which transmits these measurements to the central computer 122, which thus implements regulation of the battery so as to attain the values demanded at output of the battery.

According to a beneficial embodiment, these various parts of the battery are based on different electrochemical technologies, that is to say comprise elementary batteries of various chemical natures, so as to be able to afford complementary flexibility in the management of the battery, and to profit from the advantages of each electrochemical technology as a function of the situation and the environment of the battery. Each part thus offers different voltage levels, thereby multiplying the possible combinations and allowing increased optimization of the battery, which adapts flexibly to all cases of use.

The structure thus described of a battery is of modular type, and allows a physical implementation in the form of various independent and removable housings which can be connected with one another, by way of a communication bus and of a power bus, in a suitable frame or rack. Each housing can comprise an arbitrary sub-part of the battery, which can range from one module to several modules.

FIG. 17 illustrates such an approach in which the various housings 150 are disposed in a modular architecture of rack type. Each housing is fixed in the form of an independent sliding drawer and held by a locking/unlocking device. In their fixed position, the housings are linked to a communication bus 152 by way of a connector 153, in a highly galvanically isolated manner, and to a power bus 151 by a power connector 154 which allows them a series link with the adjacent housings. The locking/unlocking device 158 is associated with a switch system making it possible to automatically cut the connections to the communication bus and to the power bus when it is actuated in order to remove a housing 150. The connection is replaced with a short-circuit, via for example the mechanical or electrical switch 155, when the housing is removed so as not to cut the connection between the remaining housings. Accordingly, a start of locking or unlocking by an actuation of a lever or handle of the locking/unlocking device is detected and an item of information is transmitted to the battery global management system, such as a central computer. In the case of unlocking of a housing, the computer discards it immediately from the global operation of the battery and imposes a zero voltage across its terminals, thereby ensuring the safety of the future manipulations and allowing its secure storage. The connections with the power bus and communication bus are thereafter cut automatically, by a switch, in a mechanical or electrical manner. The previous operations are performed in a reversible manner in the case when a housing is introduced into the frame.

This construction presents the advantage of simplified physical management of the battery. Each subset included in each housing is managed in an independent or semi-independent manner by virtue of the architecture described in the embodiments presented previously. It is thus possible to ascertain precisely the state of charge, the state of health such as aging, possible impairment, the capacity in terms of current and voltage of each housing, and to be able to intervene on a given housing in case of failure, so as to change a module or indeed a cell, or to be able to exchange it if necessary, without penalizing the whole of the battery.

This physical assemblage can thus be integrated into an automotive vehicle as illustrated in FIG. 18, in which the various housings are distributed over the entire length in the lower part of the automotive vehicle, by way of example, joined together by a link 156 including a power bus 151 and a communication bus 152, this set being linked to a central computer 157.

Finally, the examples represented comprise few cells for the sake of clarity of the figures. However, the embodiments envisaged are suitable for the implementation of batteries able to provide a considerable output voltage, that may attain several hundreds of volts, for example greater than or equal to 250 volts. They are therefore suitable for batteries comprising a considerable number of modules, in particular greater than or equal to 8.

The invention also pertains to a method for managing a battery such as described previously. This method comprises the following steps:
  determination of the number of cells to be disposed in series and/or in parallel in the bricks and/or superbricks making up the battery;
  determination of the position of the cell switch and/or module switch and transmission of a command for opening or closing the switches as a function of the previous determination.

According to the embodiment, the battery management method comprises the following actuations of the switches of a brick of the battery:
  closing of the switches disposed on a vertical branch between the lower and upper terminals of a brick of the battery, and opening of a switch disposed on a transverse branch linking respectively the intermediate terminals disposed between the cell and a switch of each of the two vertical branches, so as to dispose the two cells of the brick in parallel, or
  opening of the switches disposed on a vertical branch between the lower and upper terminals of a brick of the battery, and closing of a switch disposed on a transverse branch linking respectively the intermediate terminals disposed between the cell and a switch of each of the two vertical branches, so as to dispose the two cells of the brick in series.

Advantageously, the battery management method according to the invention comprises the placing in parallel of the two cells of a brick when the current demanded at output of the battery exceeds a certain threshold, and a placing in series of the two cells of the brick when the voltage demanded at output of the battery exceeds a certain threshold.

The battery management method can also comprise the following actuations of the switches of a brick of the battery:
  closing of the switches disposed on a vertical branch between the lower and upper terminals of a brick of the battery and of a switch positioned on the transverse branch and openings of cell switches, so as to obtain a zero voltage difference between the upper and lower terminals of the brick,
  closing of the switches disposed on a first vertical branch between the lower and upper terminals of a brick and opening of at least one other switch so as to disconnect the cell of the second vertical branch of the brick and obtain the operation of the brick with solely the cell of the first vertical branch.

The battery management method can furthermore comprise the step of supplying electrical power to all the other components internal to the battery requiring a power supply by at least one cell of the battery.

The battery management method can also comprise the following steps:
  measurement of at least one magnitude at the level of a cell of the battery, representative of the state of the cell;
  transmission of the measured magnitude to at least one computer;
  determination of the position of the cell switch and/or module switch by taking into account the measured magnitude.

The battery management method thus makes it possible to determine at each instant the position of several switches of cells and/or modules, and/or for reversing module voltage, and/or for linking between various bricks, so as to balance each of the modules of the battery and to steer the current within each module so as to balance each of the cells of the modules, while providing the desired voltage and the desired current at output of the battery. The method will be able in particular to comprise an intermediate step consisting in diagnosing a failure and/or an at-risk state of a cell, by recognizing the cells that are defective, overheated, etc., on the basis of the magnitude measured at the level of a cell, so as to disconnect the cells concerned or discard them from the global operation of the battery.

In a battery comprising a considerable number of cells and modules, it is easy to discard a significant number thereof, for example 10% of the total number of cells, without penalizing the use of the battery since the current demanded is generally lower than the maximum current available, used solely in a situation of consumption peak. Otherwise, in case of a spike in consumption, it will always be possible to call momentarily upon the discarded cells to meet the more considerable need. Since most of the time these cells will remain unused, they will not endanger the overall health of the battery. As a remark, as long as the output voltage remains less than or equal to half the maximum voltage that can be provided by the battery as output, the configuration of the battery can contrive matters so that only half or fewer of the cells available are used in series and that the cells are placed at the minimum in parallel pairwise. In an architecture such as that proposed in relation to FIG. 4 or 5, each module can thus be freely configured.

In all cases of a demanded voltage lying between the maximum voltage that can be provided by the battery (all the bricks or superbricks in a series configuration) and the minimum voltage that it can provide (all the bricks or superbricks in a parallel configuration), the central computer determines the number of bricks or superbricks to be disposed in series and in parallel, and then more precisely at each instant the individual configuration of each brick or superbrick, as a function of the various criteria explained subsequently.

A mechanism involving the central computer in combination with a local processing circuit 130, consisting of a computer for example, can advantageously be implemented. In this solution, the choice of the configuration of the bricks and superbricks internal to a module is delegated to the local computer of the processing circuit 130 of the module, as a function of the voltage level demanded of the module by the central computer, from among a zero, single, double, triple, etc. voltage, and optionally the sign associated with this voltage if the module is equipped with an H-bridge. As there may exist several combinations to bring about one and the same voltage demanded across the terminals of the module, the local computer of the module chooses the optimal configuration from among the various possibilities as a function of the state of the cells and of the demanded current (it will seek for example to balance the state of charge of the cells of which the module is composed or to limit the mean current in an overheating cell). This local computation makes it possible to limit the uploading of information to the central computer, which would be necessary if the latter had to take precise decisions at each instant on the position of each of the transistors of the bricks and superbricks of the module. This solution limits the complexity of the computation that the central computer has to perform, allows faster reaction of a module to an abrupt change of situation (heating, current spike etc.), makes it possible to have to transmit from the central computer to the module only simplified control orders (an integer value lying between [0 and NX] or [−NX, NX] in the presence of an H-bridge at the level of the module, where NX is the maximum number of cells which can be placed in series in the module considered). To know which module(s) to use and with which voltage level, the central computer takes into account the maximum current that can be provided by each module as a function of the voltage demanded and of the global state of charge of each module. This information is stored at the level of the central computer and updated via a regular transmission of information, interleaved with dispatches of control orders from the computer to the modules. These dispatches of orders have priority so as to ensure the proper operation of the generation of the output voltage, which evolves potentially much more rapidly than the state of the cells. Moreover, the modules are regularly informed by the central computer of the current drawn at present and/or of the current which will be demanded in the very short term (for example the maximum current which will be demanded over the next half-period). This information allows the modules to know whether they can remove certain cells from operation or adopt certain configurations without any risk of not being able to satisfy the current at present or very soon (for example, this makes it possible to manage the use of an under-charged cell that will be used only when truly useful, namely example when full power is needed while the vehicle is accelerating away from a toll point).

The battery management method can also implement any regulation around an output voltage and/or current value. When the output voltage is below the setpoint value, the number n of modules in series is increased, and on the contrary if it is above the setpoint value, then this number n is decreased. To prevent the number n from oscillating between two values in order to attain an unattainable setpoint value with an integer value of n, a variation frequency limiter can be used and/or a low-pass filtering at the level of the corrector or of the return loop to achieve regulation on a mean value.

If the battery has to provide an AC voltage, or any voltage varying over time according to a given period, the placing in parallel of various parts of the battery can be decided on similar criteria, applied to the amplitude of the sinusoid or of the variable voltage to be provided, so as to avoid toggling from one mode to another too often, at each period. Overall, the lower the amplitude of the demanded voltage, the higher it will be possible for the demanded current to be.

Thus, this implementation makes it possible, at substantially constant power, to modify the values of output current and voltage. This solution is perfectly suited to the power supply of certain motors such as an automotive vehicle motor, which can require more torque at low speed, and therefore more supply current, to scale a considerable incline for example. Thus, the invention also pertains to an automotive vehicle as such, equipped with a battery such as described, removable or otherwise for its rapid exchange.

The battery management method also comprises a step of diagnosing a cell including a step of estimating the state of a cell, which can comprise by way of nonlimiting example one or more measurements of current, voltage, temperature, impedance spectrometry or the like at the level of at least one cell, all or some of the cells of the battery. Accordingly, the measured magnitude can be compared with predefined thresholds. The driving of each cell transistor then depends on this estimated state of the cell, and makes it possible for example to disconnect a cell if it shows an abnormal current or temperature or if it provides a reverse current to the other cells, as in a situation of neighbour cells which discharge across a failed cell.

The step of diagnosing a cell comprises in particular a step of estimating the charge of the cell and an estimation of its state of health. Likewise, the driving of each cell transistor depends on these estimations. It is in particular possible to establish a comparison of the estimated charge of the cell with a discharge threshold and/or a charge threshold.

The step of diagnosing a cell comprises for example a measurement of complex electrical impedance of a cell. Accordingly, the measurement of the current and of the voltage at the level of the cell is performed at an instant of passage of current in a cell, for example upon a particular command of the series switch associated with the cell, such as its opening or its closing, forced or otherwise. The response to white noise, to a step change or to a pulse allow the measurement of complex impedance, in a known manner, thereby making it possible to deduce therefrom information on the state of charge or of health of the cell.

The step of diagnosing a cell according to an embodiment of the invention also comprises a measurement of the current within a cell by way of a current transformer. The idea is to increase the frequency of the current so as to facilitate the measurement, in particular in the case of direct currents, without using direct-current pickups. To increase this frequency, a first solution consists in alternating the cells used at the level of the modules and in alternating the modules used to generate the output voltage of the battery. A second solution consists in connecting and disconnecting the cell rapidly at the moment at which its current is measured. These solutions ultimately implement a current chopping at the level of a cell, thereby making it possible to favour the measurement of this current. It then suffices to use a simple current transformer as current sensor, which can be positioned on the electronic card comprising the various electronic components mentioned described in the embodiments illustrated.

The step of diagnosing a cell also comprises the estimation of the state of charge of the cell. Accordingly, a first solution relies on the measurement of the output voltage of the cell. Another solution consists in integrating the current from the discharged state so as to ascertain the number of accumulated ampere-hours, and then the degree of charge through its ratio with the capacity of the cell. The latter solution requires a regular calibration by operations of complete charging and discharging to compensate for the drifts related to the integration of the current and to update the capacity of the cell in tandem as it ages. This calibration can be carried out on one or more cells while the others operate normally, thereby presenting the advantage of not requiring complete stoppage of the battery. To preserve the balance of the state of health of the cells of the battery, all the cells undergo substantially the same number of calibrations.

Moreover, the battery management method can implement a cyclic modification of the use of the cells, so that all or some of the cells of the battery pass from a normal operating state to a disconnected state and vice versa, according to a determined duty ratio which can be fixed or variable. This duty ratio makes it possible to fix the proportion of the time of use of each cell of the battery and to contrive matters such that for example the proportion of the time of use of the defective or overheated cells is lower than that of the cells without overheating. Such a cycle can be used for some or all of the cells, even for healthy cells, as a function of the global need in terms of current and voltage. The operating cycles of the various cells can be offset over time to obtain at each instant a substantially equivalent number of active cells for example, while guaranteeing at each instant a sufficient number of active cells to satisfy the demanded current.

Thus, the battery management method implements the following steps:
mutual balancing of the modules and/or cells, using by priority the modules and/or cells with the most charge when the battery is connected to a load and the modules and/or the cells with the least charge during the recharging of the battery;
balancing of the modules and/or cells by modifying the mean rate of use of the modules and/or cells, but without using the same modules and/or cells permanently, so that the charge of the modules and/or cells balances. Indeed, if for example one module is highly charged with respect to the other modules and that it is used permanently so that its charge attains the charge of the other modules as quickly as possible, it risks overheating. The balancing is preferably carried out permanently during the charging or the use of the battery, and it is thus not necessary for a module to be invoked heavily in order to reach equilibrium rapidly. By simply modifying the mean rate of use of such a module by a few percent with respect to the other modules, it is possible to ensure the balancing of the charge of the modules without overly unbalancing the stress and the heating of the modules of the battery pack. This balancing applies in the same manner for the cells, of one and the same module or otherwise;
the modules are chosen as a function of the current that they can provide, and invoked when they are able to provide a current greater than or equal to the current demanded. In the phases where the current demanded is lower, the modules whose capacity to provide current is lower are used;
limitation of the use of the modules and/or cells whose temperature is the highest or use in a preferential manner, when the current demanded is lower. In a generic manner, this prevents the temperature of a module and/or cell from overshooting a threshold; this risk of overshoot is anticipated. In an optimal manner, the temperature within the battery is maintained relatively uniform throughout so that the aging of the cells is kept uniform and their durability is increased.

As a variant, other strategies may be contemplated and the battery management method can for example comprise the following steps:
use by priority of a part of the battery so as to have to change only this part of the battery at the first change required. It is possible to contemplate that a part of the battery be more easily interchangeable;
use according to a higher rate of the optimized cells so as to withstand intensive use and limitation of the invoking of the remainder of the battery, which can be optimized to afford energy capacity rather. In a more generic manner, in the case of a battery with heterogeneous cell technology, that is to say uniting cells of different nature, it may be beneficial to have heterogeneity in respect of usage so as to optimize overall performance by taking account of the advantages of each cell.

As a remark, the battery management method implements a step of chopping a charging and/or discharging current of one or more cells, with the aim of slowing its aging. This chopping is easily achievable by connecting and disconnecting the cells according to a certain duty ratio or by alternating the activation of the modules, while ensuring the appropriate voltage level on the output of the battery. The chopping of the current makes it possible to attain higher "peak" currents, this being manifested within a cell by a maximum voltage higher than the normal voltage, thereby favouring the migration of the ions in the cell and reducing its loss of storage capacity.

Finally, the method for diagnosing the battery more generally comprises a step of measuring at least one magnitude characteristic of the state of a cell, such as a voltage, a current, a temperature, a number of amperes per hour, or indeed any other significant magnitude, and then a step of deciding regarding the state of the switch of the associated cell and/or module by taking account of this measurement. As has been explained hereinabove, this decision can lead to an action consisting of the total opening of a cell switch or the closing of the associated module switch so as to disconnect a cell from the remainder of the battery in case of failure of the cell, or in an intermediate manner in an alternation of opening and/or closing according to an optimal duty ratio so as to maintain the cell in an acceptable state. Thus, according to one embodiment, several thresholds can be predefined for a certain measured magnitude, so as to determine different actions according to the threshold attained. The actions engaged subsequent to the measurement of a magnitude related to a given cell will be determined so as to minimize the operations of opening and closing of switches, to avoid their overly frequent switching which consumes power, avoid their untimely switching, and control the synchronization of the switch switchings between the various cells of the battery.

The battery management method described hereinabove can be implemented by a local and/or remote computer, as was explained beforehand. This computer can comprise one or more microprocessors.

As a remark, the implementation of the method locally, without recourse to a central computer, presents the following advantages:
- as the measurement or measurements and their analysis are done locally and independently of the other modules, the reaction can be very fast. It is faster than the embodiment with a central computer which would require a communication through a link with galvanic isolation, with firstly a series coding which would induce a first lag, and then the transfer by a bus whose reduced bitrate would involve a second lag;
- in the case where a module comprises its own computer, a thorough processing of the measurements can be done, to thus achieve a precise diagnosis of each cell, its state of health and its state of charge.

Moreover, the battery management method also implements an additional step of disconnecting all the possible cells during a prolonged stoppage of use of the battery. This step affords considerable safety especially in the particular situations such as subsequent to an accident or fire. When a considerable number of cells are disconnected, and preferably all the cells, the risk of obtaining a considerable short-circuit between the cells, even in the case of a significant incident, remains very low. Moreover, the isolation of the cells during stoppage prevents the cells from discharging across certain cells with the biggest leakage current or exhibiting defects.

According to an advantageous embodiment, the management method of the invention comprises a control of switches of cells and/or of modules so as to obtain an output voltage of predefined value, and/or an alternating output voltage, according to a predefined setpoint. In a similar manner, the management method of the invention comprises a control of switches of cells and/or of modules in a charging phase so as to obtain a predefined charging voltage and/or current in each cell to be charged.

Thus, the battery management method also allows an adaptation of the output voltage according to the desired use, for example to the need of an electrical load. This adaptation comprises for example the choice of the configuration of the various bricks forming the various modules, so as to choose in particular the appropriate configuration between the possibilities of series or parallel linking of the various cells, making it possible to achieve a higher or lower output voltage, a weaker or stronger output current. It is also possible to choose a certain number of modules to be used in series, or in parallel, as well as a choice of modules remaining unused, especially when the total voltage required is below the maximum voltage that can be delivered by the battery. In this choice, it is possible to leave aside the modules with the least charge so as to favour the modules with the most charge and/or to leave unused the modules exhibiting failures, such as explained previously. As a supplement, the method can also intervene at the level of the cells themselves, the desired voltage can be obtained by disconnecting certain chosen cells of certain chosen modules, favouring for example the use of the cells with the most charge.

The adaptation of the output voltage of the battery of the invention can even take complex forms. Indeed, it is adapted for providing a sinusoidal output voltage for a synchronous or asynchronous motor of an automotive vehicle. FIG. 19 represents an example of regulating a battery to obtain such a voltage output, implemented for example within the central computer 122 described previously in the embodiments. This regulation relies on a block 80 for computing a setpoint value of the electrical parameters desired at output of the battery, comprising the setpoint voltage $V_{setp}$ and the setpoint current $I_{setp}$, as a function of the taking into account of a possible demand of a driver of the automotive vehicle in a block 81, transmitted by way of the acceleration pedal in particular, and as a function of the operating values of the motor of the automotive vehicle, such as the speed Spd and the torque Tor, which are transmitted by a block 82. As a remark, the setpoint can consist of a combination of these values of current and voltage, such as for example their product $I_{setp} \times V_{setp}$. The block 80 for determining at least one setpoint value can rely on a vector control, taking into account the adjustment of the amplitude, of the frequency and optionally of the phase of the current/voltage parameter according to the type of motor to be supplied. Naturally, this principle also operates with simpler situations, such as a DC voltage need. Thereafter, the regulating block comprises a block 83 for correction, on the basis of the difference between the setpoint values $I_{setp}$, $V_{setp}$ and the corresponding real values $I_{real}$, $V_{real}$, which transmits a need to a block 84 which determines the series or parallel configuration of the bricks, the number of modules required in the battery and optionally the particular cells of these modules to be used. According to a preferred embodiment, a choice of the cells to be used in the modules is made at the level of the modules on the basis of the locally measured parameters. Accordingly, this block 84 also receives the information regarding measurement of magnitudes effected at the level of the modules and cells of the battery, and in particular the state of charge SoC and the state of health SoH of the cells or modules. Finally, a last block 85 implements the choice determined by the block 84, and dispatches in particular the commands required for the various switches of the battery. This results at output in the real values of the current $I_{real}$ and of the voltage $V_{real}$, which are received by the motor of the automotive vehicle, which makes it possible to attain the operating values, such as a speed Spd and a torque Tor, transmitted by the block 82. Finally, a variation frequency limiter and/or a low-pass filtering can act on the correction block 83, or on the return loop, to obtain a suitable mean value, by limiting the switching frequencies of the cells, such as for example according to a frequency of 200 kHz for an output voltage of frequency 500 Hz.

Figure 1:
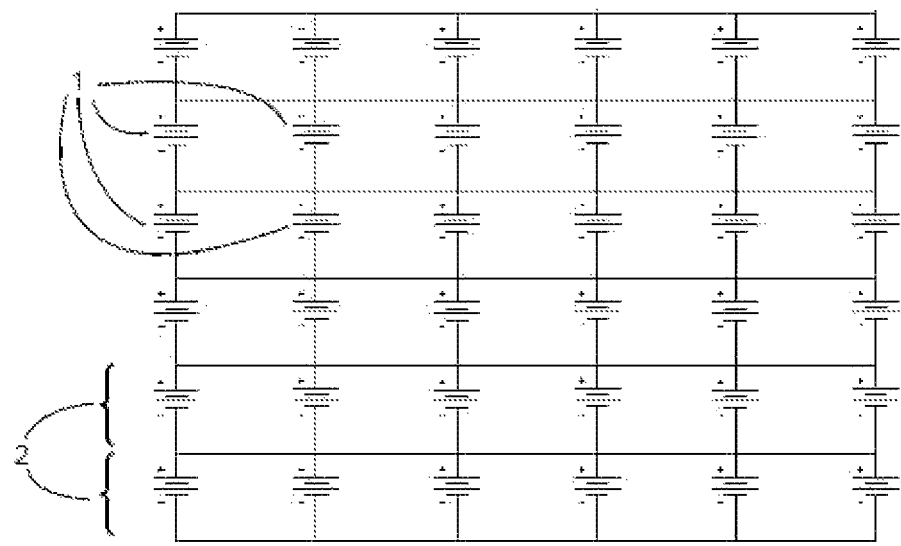
Figure 2:
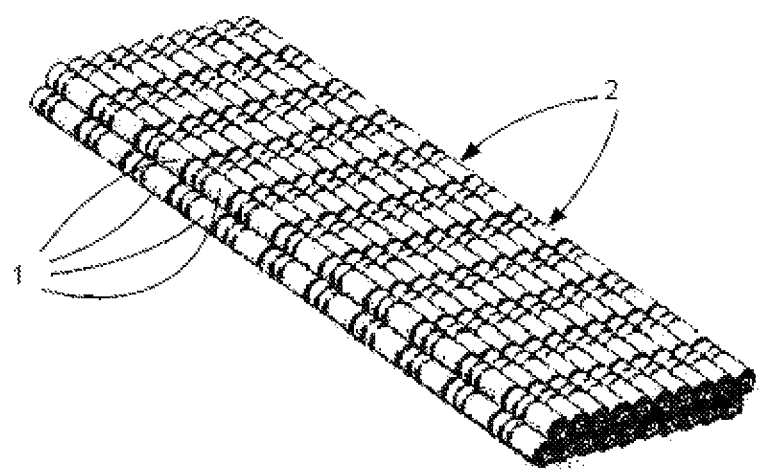
Figure 3:
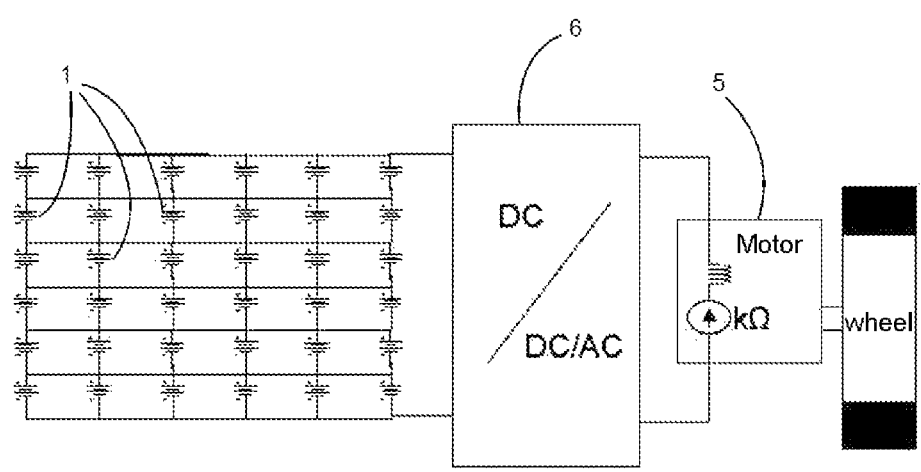

This functionality of regulating the output voltage of the battery allows it to behave as a conversion structure of switched batteries type, which avoids the use of a DC/DC converter at the output of the battery pack, to adjust the voltage to the needs of the application, thus simplifying the layout of FIG. 3 of the prior art.

FIG. 20 represents an exemplary voltage wave which can be provided by the battery via a driving such as explained hereinabove, for a voltage setpoint of sinusoid type at 100 Hz, with peak amplitude of 40 V and centred on 40 V, and for a battery consisting of 20 modules of 4 volts each and whose switching frequency is limited to 10 kHz (i.e. 100 switchings per period).

To be able to generate a single-phase voltage centred on 0, the switches making it possible to reverse the voltage (of H-bridge type) across the terminals of the modules and therefore of the battery will be used.

Moreover, the previous operating principle also applies in a similar manner in a phase of recharging the battery, which allows the battery to recharge directly through its connection to the standard electrical network. More precisely, during recharging of the battery, the latter is linked to a voltage source, and as the cells and the transistors represent an internal resistance, the flow of a current in the battery brings about a resistive voltage drop, which corresponds to the difference between the voltage imposed by the source and that when unloaded obtained by the various modules in series of the battery. The fact of being able to regulate this difference makes it possible to manage the battery charging current. Thus, the battery also implements a charging method, which comprises a step of opening and/or closing of switches to obtain a desired charging current at the level of chosen cells. Regulation similar to that explained previously can be implemented, making it possible to determine the number of modules to be placed in series, and the voltage that must be provided as output by each of these modules (parallel, series or combined configuration of the bricks and superbricks of the modules) and which ones, to obtain a setpoint of recharging current within the battery. Just as explained previously, this method comprises a step of choosing the cells to be recharged, taking account in particular of their state of charge and of their state of health. As a remark, an inductance can be placed between the source and the battery so as to smooth the current which flows between the two. This remark applies in a similar manner between the battery and a load. Thus, the battery allows recharging on the electrical network in a simplified manner, without requiring an electrical converter of voltage/current type.

As a remark, if the battery does not make it possible to generate or absorb a negative voltage, it can nonetheless accept a recharging on the network without requiring an electrical/electrical converter of voltage/current type, by using a rectifier bridge, inserted between the mains and the battery, to obtain a positive voltage U at the level of the battery.

Ultimately, the solution described previously presents numerous advantages among which:
- it relies on a multitude of elementary switches, that is to say a multitude of transistors according to the preferred embodiment, spaced far apart, thereby making it possible easily to evacuate the energy dissipated by their operation, since this dissipated energy takes the form of a multitude of small amounts of energy that are scattered within the structure of the battery;
- it makes it possible to perform real-time balancing of the cells of the battery via dynamic steering of the current;
- it makes it possible to perform real-time balancing of the modules of the battery via optimization of the rates of use of each of them;
- it makes it possible to disconnect failed cells;
- it makes it possible to limit the current in the cells whose temperature becomes too high via disconnection of the cell, totally or according to a duty ratio making it possible to achieve a mean current acceptable by the cell;
- it makes it possible to adjust the output voltage of the battery in a gentle manner (low-frequency switching <1000 Hz and with fairly low voltage tiers, for example 4V), without requiring high-frequency chopping of the full voltage of the battery. It makes it possible to adjust a DC voltage desired for the driving of DC motors or for recharging on a continuous source. It also makes it possible to generate an AC voltage for the driving of synchronous or asynchronous motors, etc., or for direct recharging on the electrical network;
- it makes it possible to individually isolate a cell of a module, by making it possible in particular to measure its no-load voltage even if the battery is in operation;
- it makes it possible to isolate all the cells, for example when the vehicle is stopping or subsequent to the detection of a major failure, making it possible to dismiss all electrical risks in respect of the user or people who will have to intervene, for example firemen in case of fire.

By measuring at one and the same time the voltage of the cells and the voltage of a module of the battery, it is possible to deduce therefrom the voltages across the terminals of the power transistors. On the basis of these voltages and of the current passing through the cells or transistors of modules, it is possible, in certain configurations, to detect whether a transistor has failed. Thus, the battery also implements a method for diagnosing the operation of all or some of the transistors which fulfil the essential functions of switches, which can comprise all or some of the following steps:
- if during the application of a certain configuration of the transistors in the module, the module voltage is significantly less than the envisaged voltage, this implies that a shunt transistor or a transistor for placing in parallel is no longer opening correctly;
- if during the application of a certain configuration of the transistors in the module, the module voltage is significantly greater than the envisaged voltage, this implies that a transistor for placing in series is no longer opening correctly;
- if a voltage appears at the terminal of a transistor whilst it is supposed to be closed, this implies that either it is no longer closing correctly, or that the current is abnormally high and that a neighbour transistor is no longer opening correctly;
- if the current in a cell is not zero whilst the cell is supposed to be disconnected, this implies that one of the cell transistors is not opening;
- if the voltage on each branch of the optional H-bridge does not correspond to the envisaged voltage, this implies that either one of the transistors of the branch is no longer closing, or that on the contrary it is no longer opening.

Naturally, the invention is not limited to the previous examples. In particular, several measurement sensors per cell have been implemented but as a variant other numbers of measurement sensors can be chosen. Moreover, it is possible to use other types of measurement sensors than those described, so as to measure magnitudes characteristic of the state of a cell other than the voltage, current or temperature. Each cell can exhibit any form and be based on any energy storage technology, without limitation to Lithium-Ion presented in greater detail in an embodiment of the invention.

When using a current sensor per cell for example, this sensor can readily be calibrated via a reference current sensor situated at the level of the power path and interrogated by the central computer. The latter then distributes the measured value to the set of modules via the communication bus and each module is then able to verify that the sum of the currents passing through the cells placed in parallel in the module corresponds to this global current and if an error appears, to establish a law for correcting the values measured on each cell. This calibration seems in particular obvious when the cells are in a configuration in which they are all in series, since the same current passes through each of the cells and corresponds to the current of the power path (apart from the sign when using an H-bridge at the level of the module). This calibration, which can be done very regularly, makes it possible potentially to use very low-cost sensors at the level of each cell (poorly calibrated at the outset and exhibiting drifts versus temperature and over time). It is potentially possible for example to use the voltage drop across the terminals of the cell transistors when they are closed to estimate the current which passes through them and therefore the current which passes into the cells to which it is attached.

Moreover, the previous embodiments have been described by implementing a certain brick in a module of the battery. However, it would be possible to obtain an improvement of a battery by managing only some of its modules according to the concept of the invention, and therefore disposing cell switches and cells to form bricks or superbricks only on a part of the battery. Certain modules might not implement the approach described previously and it is possible to contemplate a battery associating conventional modules and improved modules according to the invention. Moreover, the various bricks and/or superbricks described previously could also be combined to form other battery architectures.

FIGS. 22 to 24 illustrate variant embodiments for implementing a shunt function for several modules of a battery, which relies on complementary switches disposed in parallel with several modules making it possible to add a flow path for the current when several modules are deactivated, thus limiting the losses. In these figures, the bricks are represented in a partial and incomplete manner to simplify the representation, but they are of the form described previously. As a remark, if the modules exhibit an inverter H-bridge at output, the complementary switches will preferably be of bidirectional type in terms of voltage (not exhibiting any parallel reverse diode).

Thus, FIG. 22 adds a first series of switches 214 each making it possible to shunt four consecutive modules, a second series of switches 314 each making it possible to shunt six consecutive modules, a third series of switches 414 each making it possible to also shunt six consecutive modules but offset with respect to the second series, a fourth series of switches 514 each making it possible to also shunt six consecutive modules but offset with respect to the previous two series, a fifth series of switches 614 each making it possible to shunt eight consecutive modules and a sixth series of switches 714 each making it possible to also shunt eight consecutive modules but offset with respect to the fifth series.

All the switches of these various series are disposed between the lower and upper terminals of different modules, in parallel with one another. Naturally, their management is consistent so as to avoid creating short-circuit situations, as has been explained in the previous examples.

The two FIGS. 23 and 24 illustrate two other variant embodiments according to the same approach.

The advantage of these various embodiments is to add flow paths for the current that are much more direct upon the deactivation of several modules by virtue of switches which shunt several modules at one and the same time, thereby generating much fewer losses. Thus, at each instant, according to the number of modules required, a substantially optimal configuration is implemented to minimize the total resistance of the battery.

The various switches mentioned previously in all the embodiments have been implemented with the aid of transistors. NMOS or PMOS transistors have been principally represented, but it is however possible to use NPN and PNP bipolar transistors, which present the advantage of being able to be controlled with a fairly low voltage, FET, JFET, IGBT, GaN transistors, relays, etc. As a variant, switches of any other type to those described could be implemented, such as thyristors if the current is naturally made to reverse at the moment at which it is desired to open it.

The battery of the invention can be managed by an intelligent unit, a local and/or remote computer or processing circuit accessible through a local communication device, this computer being able to comprise any software and/or hardware element for managing the battery, in particular for determining the configuration of its switches. Accordingly, the battery can integrate any means of actuation, any control circuit, for its switches.

Numerous other variant embodiments of the invention can easily be contemplated through a simple combination of the embodiments and/or their variants described previously.

As a remark, communication within the battery and/or to an outside unit can be done according to a carrier current principle, provided that the current demanded by a load or provided by a source is not too considerable to authorize the disconnection of certain cells. Indeed, this principle relies on an intentional alternation of connections and disconnections of certain cells of the battery, so as to create a modulation of induced current and a modulation of power at the level of a module, which propagates to the whole of the battery and beyond. This power modulation is therefore visible to the other modules of the battery and to an outside load, thereby making it possible to use it to transmit information according to any communication protocol, existing and standardized or not. A master circuit may for example be defined which interrogates all the cells in turn, through their address, each cell thereafter responding in a dedicated time slot. The master can for example request an item of information such as a measurement of voltage, current and/or temperature at a certain cell, and then the latter can dispatch the item of information requested with optionally a code making it possible to inform regarding a possible failure or otherwise. This principle thus allows various cells of the battery to communicate simply with one another, or to communicate towards a central computer or a processing circuit of the battery or towards an outside unit. As a remark, the modulation of current can be done without disconnecting a cell completely, but simply by modulating the resistance in the passing state of the cell transistor, that is to say by modulating the gate voltage of the transistor around a bias point. This prevents the cell from being disconnected completely and from excessively overloading the other cells of the module which take over regarding the flow of the current. This modulation of resistance in the passing state can also be done on the module transistor when the latter is activated. This then makes it possible to communicate even if all the cells are deactivated by the opening of the cell transistors. Communication by carrier current makes it possible to modulate a considerable current at the level of the stage without however engendering considerable electrical losses. Indeed, this current modulation is done by modulating a consumption of current which is simply stored and destored since it belongs to a battery, this implying that the losses which exist in a dissipative element such as a resistor or a transistor in linear mode, conventionally used for a carrier current system, do not exist.

FIG. 21 thus schematically illustrates the basic implementation, wherein a first module 112 of a battery generates a communication signal 100 by the actuation of at least one cell switch, while a corresponding signal 101 is thereafter received at the level of a second module 112 of the battery.

The invention has been described with embodiments in which each stage or module is composed of bricks and/or superbricks of elementary cells, all comprising switches driven by a control circuit. As an implementation variant, several elementary cells can be grouped together to form more significant cells or groupings of cells. Thereafter, the architecture of the invention applies to these groupings of cells. Thus, the invention integrates any embodiment in which the cell considered to be an elementary cell in the previous embodiments in fact corresponds to a grouping of cells, which take the form of a monolithic assembly, whose connection technology is set and un-modifiable, even optionally consisting in a housing with at least two exterior terminals, in a format and a usage that are ultimately similar to those of an elementary cell such as defined previously. The term "cell" throughout the description must therefore be understood to mean any entity of electricity storage elements, ranging from an elementary cell, such as a Lithium-Ion battery, to the association of a multitude of elementary batteries.

Moreover, the invention is also compatible with a three-phase implementation. FIG. 25 illustrates simply a battery comprising three power storage columns 22, each of similar architecture to a battery according to the invention such as described previously, making it possible to supply a three-phase motor 115.

Moreover, the architecture of the battery solution described previously allows the implementation of other beneficial functions.

A first function consists of a measurement of electrical impedance. Accordingly, it is possible to close and/or open at least one cell switch 113 associated with a cell 111, to allow or not allow part of the current flowing in the battery pack to pass through the cell. By monitoring the instants of passage of the current into the cell and by measuring the current and voltage at the level of the cell, it is possible to deduce therefrom the complex electrical impedance of the cell. Conventional procedures such as the response to white noise, to a step change or to a pulse are well known for identifying the electrical characteristics of an electrical element. This complex electrical impedance measurement makes it possible potentially to give additional information with respect to the measurements of current, voltage and temperature so as to better estimate the state of charge and of health of the cell.

This measurement of complex impedance on the basis of well defined control of the series switch is advantageously performed while the other cells of the brick and/or of the module take over the current when the series switch is open. As a variant, it is also possible to perform this measurement on the basis of the normal operation of the battery, which naturally generates step changes of current in the cells when the cells (or the module) are activated.

If the current consumed in the battery pack is more or less direct or low frequency, it may be necessary to use current pickups which pass the DC to measure it (sensors which measure the magnetic field in proximity to the passage of the current, hall-effect sensor or use of shunt resistors). These sensors have the particular feature of being relatively expensive and greedy in terms of energy. To circumvent this limitation, it is possible by virtue of the architecture adopted, to artificially increase the frequency of the current consumed in the cells with respect to the current flowing in the load. Indeed, it is possible to alternate the cells used at the level of the modules and it is possible to alternate the modules used to generate the output voltage. It is also possible to effect fast connection/disconnection of a cell precisely at the moment when it is desired to measure its current. This chopping of current at the level of the cells or modules allows the current to be measured more easily since its frequency is increased. It is for example possible to use a simple current transformer which can be integrated directly onto a PCB card which serves as support for the measurement electronics. By disconnecting the cell, the current which passes through the cell is cancelled and the magnetic material of the current transformer is desaturated (saturation related for example to the flow of a direct or very low-frequency current). When the cell is reconnected, the current transformer behaves as a true current transformer until the material is again saturated. Before this saturation, one profits therefrom to perform the measurement of current at the secondary of the transformer. Finally, the cell is temporarily disconnected each time that it is desired to perform a current measurement.

A second function is a measurement of current. It is moreover possible to temporarily disconnect the cell (more optionally prevent the current from passing through a reverse diode) to calibrate other types of current sensor: it is known that when the cell is disconnected, the current which passes through it is zero, thereby making it possible to calibrate the zero of the sensor. It is also possible to calibrate other points of the characteristic of the sensor if a known calibrated current is made to flow in the battery pack (for example at the moment of recharging of the pack), or if the current is measured with a calibrated and precise current sensor at the level of the battery pack. Thereafter, by steering the current from one cell to another at the level of each stage by connecting the cells one by one, it is possible to calibrate the current sensor of each cell in relation to this point of current and do the same for other points of current. Ultimately, if the concept is extrapolated a little more, with a single, stable and precise calibrated current sensor placed in the battery pack (at the level of a cell or of the pack), it is possible, with the suite of switches, to calibrate all the other current sensors of the battery pack. This possibility of real-time calibration of the current sensors, in particular during operation of the battery pack, makes it possible to use very low-cost sensors (since they do not need to be very stable over the long term).

A third function consists of a calibration of the measurement of the state of charge or of the state of health of the battery. To compute the state of charge of a cell, the commonest solution is to measure the voltage across the terminals of the cell. For the elementary batteries whose active part relies on an advanced chemical principle, of Iron Phosphate Lithium-ion type, the measurement of the voltage is not very precise since the latter depends rather more on the temperature than on the state of charge, especially when the end of charging or of discharging is far away. To have a more precise measurement of the state of charge, it is known that it is possible to integrate the current which passes through the cell. By starting from a discharged state and integrating the current (number of accumulated ampere-hours) and knowing the capacity of the cell (number of ampere-hours that the elementary battery can store) then it is possible to deduce therefrom, by taking the ratio of the two values, the degree of charge of the cell. This solution is rather more reliable, but it demands regular calibrations, since the computation for integrating the current has a tendency to drift in the course of time because of inaccuracies in the measurement of the current, leakage currents which are not taken into account, and because of the fact that by aging the cell loses its capacity (the number of storable ampere-hours decreases). It is therefore necessary to perform calibrations. Accordingly, a contemporary solution consists in charging and/or discharging the battery pack completely after a certain number of cycles or a certain time of usage. A complete discharge followed by a complete recharge makes it possible for example to update the storage capacity of the cell (number of ampere-hours). This operation takes a fairly considerable time, a duration of two to three times as considerable as the duration of a simple normal battery recharging situation. Moreover, this operation consumes energy in part lost (during complete discharging).

To circumvent these drawback, the battery architecture according to the solution makes it possible to carry out these operations, not on the complete battery pack, but simply on some of the cells of the battery pack, on at least one cell, so as to be able to continue to use the battery pack during these calibration phases, with an available total capacity reduced by only a few percent. The calibration then consists in completely discharging and charging one or a few cells of the battery, and in reupdating the capacity of the cell as well as its ampere-hour counter. On the basis of this analysis on a few cells, the state of the complete battery pack can be deduced therefrom in part by extrapolation. So as not to unbalance the number of charge/discharge cycles performed by each of the cells, it suffices to change calibration cells at each calibration: a different series of cells is sampled at each calibration.

A fourth function consists of an improvement of the operation of a cell. Certain cells contain a chemical active part which ages less quickly when their charging or discharging current is chopped. Indeed, for one and the same power dissipated in the cell, it is possible to attain higher "peak" currents if the current is applied for only a certain proportion of the time, in a chopped manner, since the losses are reduced. This higher peak current is manifested also in the cell by a peak voltage slightly higher than the normal voltage of the cell and the latter has a tendency to displace the ions in the cell with more energy, this tending to favour their migration from one electrode to the other and to a certain extent to improve their insertion into the gathering electrode. This principle allows the cell to limit its loss of storage capacity from one charge/discharge cycle to the other and therefore to slow down its aging. Within the framework of the chosen architecture, it is easy to chop the current in the cells of the battery, by alternating the passage of the useful global current from one cell to the other, for example, by connecting the cells with a certain duty ratio (with a phase shift in the connections/disconnections of the various cells of a stage) or by alternating the activation of modules, by activating the switches concerned, while ensuring the appropriate voltage level on the output.

As a remark, all or some of the cells of a battery such as is described previously can be associated with a local energy source, for example such as a solar sensor, hydrogen fuel cell, thermal sensor, mechanical/electrical converter, etc., so as to profit from this source for its recharging for example, and/or to afford additional possibilities in respect of the provision of energy by the battery.

The invention claimed is:

1. Storage battery comprising several storage cells disposed in several modules linked together in series, wherein a module comprises at least one brick comprising a lower terminal and an upper terminal, between which are arranged two storage cells and at least three switches, the at least three switches connected to the two storage cells such that closing one or more of the switches connects the two storage cells either in series or in parallel between the two terminals and in that the storage battery comprises a control circuit for the switches of the said at least one brick, wherein the storage battery further comprises a local communication device supplied by said module configured to communicate with a remote system.

2. Storage battery according to claim 1, wherein the at least one brick comprises a first branch extending between its lower and upper terminals and comprising in this order a storage cell and a switch (K1), a second branch parallel to the first between its lower and upper terminals comprising in this order a switch (K3) and a storage cell, and an intermediate branch comprising a switch (K5) and linking respectively the intermediate terminals disposed between the storage cell and the switch of each of the two parallel branches.

3. Storage battery according to claim 2, wherein the at least one brick comprises two additional switches (K2, K4) disposed respectively on each parallel branch on the side of the storage cell.

4. Storage battery according to claim 1, wherein it comprises a module comprising a lower terminal and an upper terminal, between which are disposed two bricks, linked by three branches and three switches (K7, K8, K9) disposed respectively between the two lower terminals of the two bricks, between their two upper terminals, and between the upper terminal of the first lower brick and the lower terminal of the second upper brick, so as to be able to dispose the two bricks in series or in parallel.

5. Storage battery according to claim 4, wherein it comprises a module comprising a lower terminal and an upper terminal, between which are disposed several sets of more than two bricks being able to be disposed in series or in parallel, these sets being able to be disposed in series and/or in parallel between the two terminals, lower and upper, of the module with the aid of several switches.

6. Storage battery according to claim 1, wherein it comprises a module comprising a lower terminal and an upper terminal, between which are disposed four bricks so as to form a superbrick, this superbrick comprising a first set comprising a first brick linked to the lower terminal of the module, and linked to a second brick linked to the upper terminal of the module by way of three switches making it possible to dispose these two bricks in series or in parallel, and comprising a second set of two other bricks disposed between the two terminals, lower and upper, of the module in parallel with the first set of the two bricks.

7. Storage battery according to claim 6, wherein it comprises at least one intermediate electrical link distinct from the upper and lower terminals between the two sets of two bricks.

8. Storage battery according to claim 1, wherein each module comprises a lower terminal and an upper terminal between which are disposed several bricks in parallel, and/or several sets of two bricks joined together in parallel, and/or several superbricks in parallel.

9. Storage battery according to claim 1, wherein it comprises at least one module which comprises several switches so as to be able to cancel the output voltage of the module and/or to form a device for inverting the output voltage of the module (function of H-bridge type).

10. Storage battery according to claim 9, wherein all the modules comprise a device of H-bridge type for inverting their output voltage, to invert, cancel the output voltage or shunt one or more module(s).

11. Storage battery according to claim 1, it comprises a control circuit for at least one switch (K1 to K13) supplied electrically directly by at least one storage cell of a module of the storage battery.

12. Storage battery according to claim 1, wherein it comprises at least one switch able to shunt one or more successive modules of the storage battery.

13. Storage battery according to claim 12, wherein the control circuit drives at least one transistor used to form a storage cell switch, and/or at least one transistor used to form a module switch and/or at least one transistor to form a device for series/parallel inversion between two bricks of a module (K7, K8, K9), and/or at least one transistor to form a device for inverting or cancelling the output voltage of the module (function of H-bridge type) (K10 to K13), and/or at least one transistor to shunt several adjacent modules.

14. Storage battery according to claim 1, wherein it comprises an electronic card disposed between each module of the storage battery or a single electronic card on which are disposed all the modules of the storage battery or several electronic cards each associated with one or more module(s).

15. Storage battery according to claim 1, wherein it comprises at least one sensor for measuring a magnitude characteristic of the state of the storage cells of a module and wherein the control circuit for the switches of the module controls them as a function of the magnitude characteristic of the state of its storage cells and as a function of the demand of a load powered by the storage battery.

16. Storage battery according to claim 15, wherein it comprises a sensor for measuring the current at the level of a storage cell, and/or a sensor for measuring the voltage across the terminals of a storage cell and/or across the terminals of its storage cell switch, and/or a sensor for measuring the temperature of a storage cell and/or for impedance spectrometry measurement.

17. Storage battery according to claim 1, wherein it comprises at least one processing circuit at the level of a module and/or a central computer, which drives(drive) the switches of a module by way of the control circuit.

18. Storage battery according to claim 17, wherein it comprises a central computer and a communication bus linking the various modules to the central computer by way of a galvanic isolation.

19. Storage battery according to claim 1, wherein the switches of the at least one brick are transistors.

20. Storage battery according to claim 1, wherein it comprises several parts of several modules comprising storage cells of different electrochemical technology.

21. Method for managing a storage battery according to claim 1, wherein it comprises a step of determining the position of the switches of a brick of the storage battery so as to dispose its two storage cells in series or in parallel.

22. Method for managing a storage battery according to claim 21, wherein it comprises the following actuations of the switches of a brick of the storage battery:
 closing of the switches disposed on a first branch disposed between the lower and upper terminals of a brick of the storage battery, and opening of a switch disposed on an intermediate branch linking respectively the intermediate terminals disposed between the storage cell and a switch of two parallel branches, so as to dispose the two storage cells of the brick in parallel, or
 opening of the switches disposed on a first branch between the lower and upper terminals of a brick of the storage battery, and closing of a switch disposed on an intermediate branch linking respectively the intermediate terminals disposed between the storage cell and a switch of two parallel branches, so as to dispose the two storage cells of the brick in series.

23. Method for managing a storage battery according to claim 21, wherein it comprises the placing in parallel of the two storage cells of a brick when the current demanded at output of the storage battery exceeds a certain threshold, and a placing in series of the two storage cells of the brick when the voltage demanded at output of the storage battery exceeds a certain threshold.

24. Method for managing a storage battery according to claim 21, wherein it comprises the following actuations of the switches of a brick of the storage battery:
 closing of the switches disposed on a first branch between the lower and upper terminals of a brick of the storage battery and of a switch positioned on the intermediate branch and openings of additional switches disposed respectively on each parallel branch on the storage cell side, so as to obtain a zero voltage difference between the upper and lower terminals of the brick,
 closing of the switches disposed on a first branch between the lower and upper terminals of a brick and opening of at least one other switch so as to disconnect the storage cell of the second parallel branch of the brick and obtain the operation of the brick with solely the storage cell of the first branch.

25. Method for managing a storage battery according to claim 21, wherein it comprises a step of electrical powering of a control circuit of a switch of a brick of the storage battery on the basis of at least one storage cell of the storage battery.

26. Method for managing a storage battery according to claim 21, wherein it comprises the following steps:
 measurement of at least one magnitude at the level of a storage cell of the storage battery, representative of the state of the storage cell;
 transmission of the said measured magnitude to at least one processing circuit or a computer;
 determination of the position of a switch of a brick by taking into account the said measured magnitude;
 control of the opening or closing of at least one switch of the brick comprising the said storage cell.

27. Method for managing a storage battery according to claim 26, wherein it comprises a step consisting in comparing a measured magnitude with a threshold to diagnose the state of the storage cell, estimate the charge of the storage cell and/or its state of health.

28. Method for managing a storage battery according to claim 21, wherein it comprises all or some of the following steps:
 mutual balancing of the modules and/or storage cells, by using by priority the modules and/or storage cells with the most charge when the storage battery is connected to a load and the modules and/or the storage cells with the least charge during the recharging of the storage battery;
 balancing of the modules and/or storage cells by modifying a mean rate of use of the modules and/or storage cells, but without using the same modules and/or storage cells permanently, so that the charge of the modules and/or storage cells balances;
 choice of use of the modules as a function of the current that they can provide;
 limitation of the use of the modules and/or storage cells whose temperature is the highest or use in a preferential manner when the current demanded is lower;
 maintaining homogeneous of the temperature within the storage battery.

29. Method for managing a storage battery according to claim 21, wherein it comprises a step of cyclic opening/closing of at least one switch of a brick of the storage battery so as to disconnect/connect a storage cell of the brick, the duty ratio being fixed as a function of the total time of use of the said storage cell, itself determined as a function of the global need in terms of current and voltage of the storage battery and as a function of the diagnosis of the storage cell considered.

30. Method for managing a storage battery according to claim 21, wherein it comprises a step of communication by carrier current between a processing circuit of a brick and that of another brick or a central computer or a load.

31. Method for managing a storage battery according to claim 21, wherein it comprises a step of regulating the output voltage of the storage battery which comprises a step of opening/closing of switches of bricks of the storage battery so as to follow an imposed output voltage setpoint.

32. Method for managing a storage battery according to claim 21, wherein it comprises a step of disconnecting all the storage cells of the storage battery in case of prolonged stoppage of the storage battery or of incident.

33. Method for managing a storage battery according to claim 21, wherein it comprises a step of diagnosing the operation of all or some of the switches.

34. Method for managing a storage battery according to claim 21, wherein it comprises a step of estimating the state of health SOH of a storage cell comprising a cycle of charging and discharging of the said storage cell, during the normal operation of the remainder of the storage battery.

35. Method for managing a storage battery according to claim 21, wherein it comprises a step of estimating the complex electrical impedance of a storage cell by observing its response in current and/or voltage to its connection and/or disconnection either forced, or during the normal operation of the storage battery.

* * * * *